US011100809B2

(12) United States Patent
Thorne

(10) Patent No.: US 11,100,809 B2
(45) Date of Patent: Aug. 24, 2021

(54) ENHANCING CONTRAST OF LED LIGHTING

(71) Applicant: Lawrence R. Thorne, Draper, UT (US)

(72) Inventor: Lawrence R. Thorne, Draper, UT (US)

( * ) Notice: Subject to any disclaimer, the term of this patent is extended or adjusted under 35 U.S.C. 154(b) by 0 days.

(21) Appl. No.: 17/019,566

(22) Filed: Sep. 14, 2020

(65) Prior Publication Data

US 2020/0413505 A1    Dec. 31, 2020

Related U.S. Application Data

(62) Division of application No. 16/463,564, filed as application No. PCT/US2017/063292 on Nov. 27, 2017, now Pat. No. 10,779,370.

(60) Provisional application No. 62/497,711, filed on Nov. 29, 2016, provisional application No. 62/548,229, filed on Aug. 21, 2017.

(51) Int. Cl.
| | | |
|---|---|---|
| *G08G 5/00* | (2006.01) | |
| *B64D 47/04* | (2006.01) | |
| *G02B 5/30* | (2006.01) | |
| *H04N 5/225* | (2006.01) | |
| *H05B 45/20* | (2020.01) | |

(Continued)

(52) U.S. Cl.
CPC .......... *G08G 5/0026* (2013.01); *B64D 47/04* (2013.01); *G02B 5/3025* (2013.01); *H04N 5/2256* (2013.01); *H05B 45/20* (2020.01); *H05B 45/39* (2020.01); *H05B 47/155* (2020.01);

(Continued)

(58) Field of Classification Search
None
See application file for complete search history.

(56) References Cited

U.S. PATENT DOCUMENTS

| | | |
|---|---|---|
| 4,777,660 A | 10/1988 | Gould et al. |
| 6,119,055 A | 9/2000 | Richman |

(Continued)

FOREIGN PATENT DOCUMENTS

| | | |
|---|---|---|
| CN | 104237873 A | 12/2014 |
| EA | 201300973 A1 | 1/2015 |

(Continued)

OTHER PUBLICATIONS

International Search Report dated Jul. 4, 2019, in International Application No. PCT/US2017/063292, filed Nov. 27, 2017; 3 pages.

*Primary Examiner* — Crystal L Hammond
(74) *Attorney, Agent, or Firm* — Thorpe North & Western, LLP

(57) ABSTRACT

A light-transmitting subsystem can include an LED light source including a first to LED light to emit a first wavelength of light with a first center-emission wavelength and a second LED light to emit a second wavelength of light with a second center-emission wavelength that is offset from the first center-emission wavelength. The system can include a first reference oscillator to receive a reference signal from a remote or broadcasting source, and can also include a synchronous modulation and power system to convert the reference signal from a synchronous relative high frequency signal to a synchronous relative low frequency signal and provide synchronized power pulses to the first LED light and the second LED light in synchronous correlation with the synchronous relative low frequency signal to generate a stream of modulated light-signal pulses which includes a first modulated wavelength of light and a second modulated wavelength of light.

29 Claims, 6 Drawing Sheets

(51) Int. Cl.
*H05B 47/19* (2020.01)
*H05B 47/155* (2020.01)
*H05B 45/39* (2020.01)
*H05B 47/16* (2020.01)
*H05B 45/10* (2020.01)

(52) U.S. Cl.
CPC ............ *H05B 47/16* (2020.01); *H05B 47/19* (2020.01); *B64D 2203/00* (2013.01); *H05B 45/10* (2020.01)

(56) References Cited

U.S. PATENT DOCUMENTS

| | | |
|---|---|---|
| 7,597,447 B2 | 10/2009 | Larson et al. |
| 7,705,879 B2 | 4/2010 | Kerr et al. |
| 8,488,978 B2 * | 7/2013 | Watanabe ............. G02F 1/3515 398/183 |
| 9,000,350 B1 | 4/2015 | Tiana et al. |
| 9,178,615 B2 * | 11/2015 | Roberts ................ H04B 10/116 |
| 2003/0164914 A1 | 9/2003 | Weber et al. |
| 2007/0016080 A1 | 1/2007 | Alfano et al. |
| 2010/0002296 A1 | 1/2010 | Choi et al. |
| 2012/0128374 A1 | 5/2012 | Yang et al. |
| 2014/0077974 A1 | 3/2014 | Niino |
| 2014/0093238 A1 | 4/2014 | Roberts |
| 2016/0050022 A1 | 2/2016 | Roberts et al. |

FOREIGN PATENT DOCUMENTS

| | | |
|---|---|---|
| WO | WO 9638831 A1 | 12/1996 |
| WO | WO 2013136301 A2 | 9/2013 |
| WO | WO 2014012110 A2 | 1/2014 |

\* cited by examiner

ENHANCING CONTRAST OF LED LIGHTING

This application is a divisional application of U.S. patent application Ser. No. 16/463,564, filed on May 23, 2019, which was a national stage of PCT/US2017/063292 filed on Nov. 27, 2017, which claimed priority to and the benefit of U.S. Provisional Application No. 62/497,711, filed on Nov. 29, 2016 and U.S. Provisional Application No. 62/548,229 filed on Aug. 21, 2017, each of which are incorporated herein by reference.

BACKGROUND

The myriad operational, financial, and safety implications of airline flight delays/cancellations caused by visibility-reducing atmospheric conditions (such as fog, smog, dust, and storms) are well documented. These circumstances may be infrequent or frequent in occurrence depending on the geographical area, and in some instances, can have a major impact that is becoming increasingly significant as air travel and airport congestion worldwide escalates.

Many airports may now be converting to LED (light-emitting diode) lighting, which has certain advantages over the older incandescent and gas discharge lamps that have been more traditionally used, particularly in terms of color purity and saturation, energy efficiency, and lifetime. In low visibility conditions, however, LED lighting provides about the same level of visibility or may only be slightly better than the lighting systems that it is replacing.

BRIEF DESCRIPTION OF THE DRAWINGS

Various embodiments of the present disclosure are shown and described in reference to the numbered drawings, wherein.

DETAILED DESCRIPTION

In accordance with examples of the present disclosure, an LED (light-emitting diode) light system may offer visibility improvements under visibility-reducing atmospheric conditions (such as fog, smog, dust, and storms) in both daytime and nighttime conditions, otherwise referred to herein as "low visibility conditions." This is, in part, because the photonic properties of LEDs can be exploited using the technology described in the present disclosure in a manner that can improve the visibility efficacy of the LED light source when digitally processed and displayed. As a preliminary matter, the term "LED" includes any solid state diode light source, such as a LED light, a laser diode, a super radiant diode, or the like.

The LED contrast enhancing system of the present disclosure can be applicable in many industries where one or more mobile carrier would benefit from enhanced visibility of LED lights, such as when navigating unknown and/or potentially dangerous terrain in low visibility conditions. Examples of "mobile carriers" can include fixed wing aircraft, rotary aircraft, automobiles, motorcycles, buses, semi-trailer trucks, boats, ships, trains, etc., regardless of whether the mobile carrier carries a single operator (e.g., pilot or driver), additional people and/or cargo other than the operator(s), or does not carry any passengers, e.g., aircraft drones or other remote operated vehicles or vessels.

In further detail, in accordance with examples of the present disclosure, low visibility conditions may be relative to the type of mobile carrier being operated. For example, a small fishing boat with high maneuverability may consider low visibility conditions to be anything less than ¼ mile, ⅛ mile, 100 yards, or 100 feet. On the other hand, in the case of aircraft navigation, low visibility unsuitable for Visual Flight Rules (VFR) in controlled airspace can be anything less than 3 statute miles. In further detail, the LED contrast enhancing systems of the present disclosure can be appropriate for implementation across a variety of locations, including commercial, civilian, or military airfields, including at established runways, heliports, and aircraft carriers at sea, as well as oil rigs landing sites, etc., and in a variety of other maritime operations, remote field, and/or disaster response efforts, etc. These types of system could also be used at makeshift runways on private property, for example.

Turning now to the FIGS., it is understood that the figures presented herein are examples only, and other components can be used in addition to what is shown in accordance with examples of the present disclosure. In other words, the figures are provided for explanatory purposes to aid in the explanation and understanding of the present technology.

Figure 1:
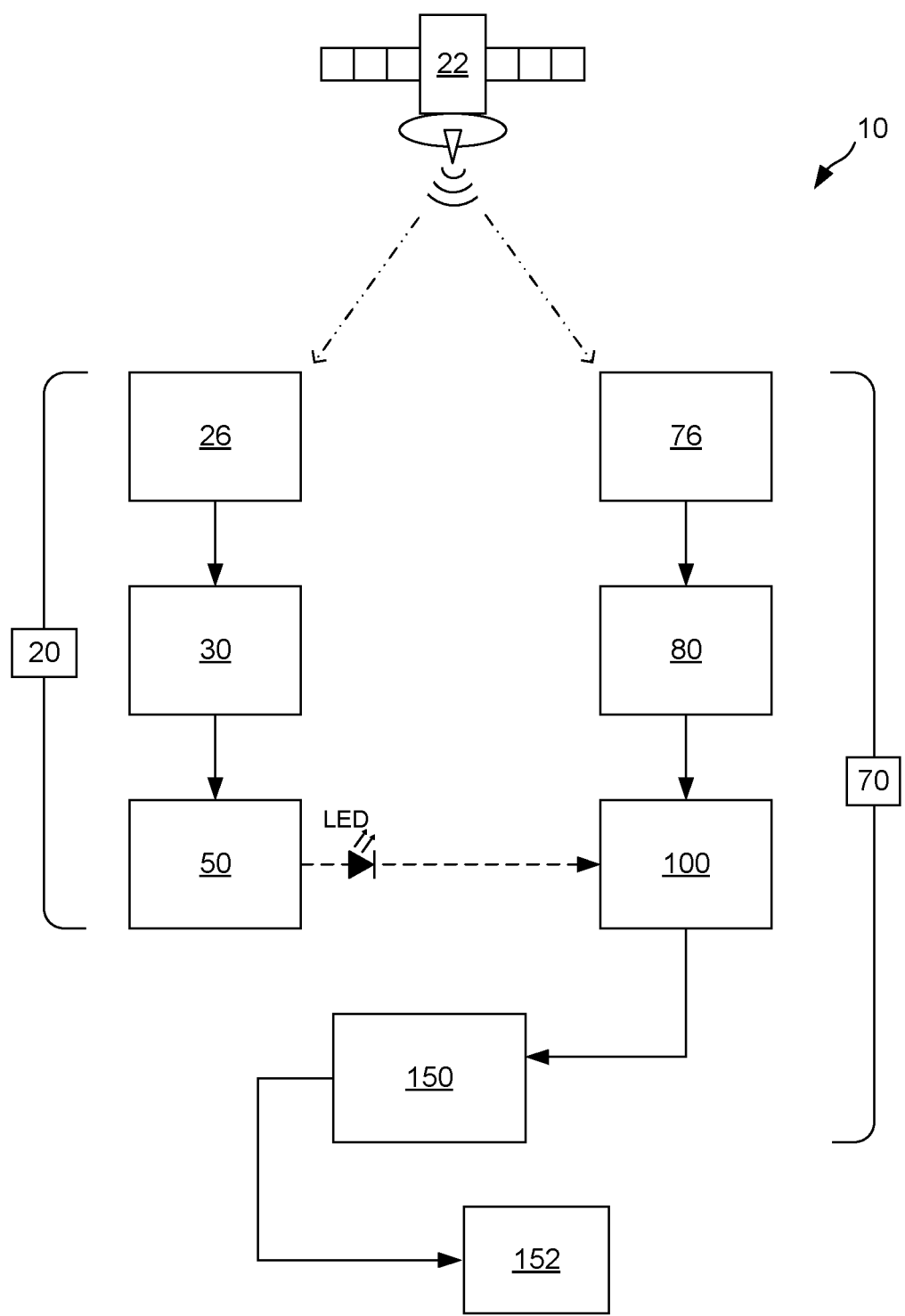
FIG. 1 is a component diagram of an example system for enhancing contrast of LED lighting in accordance with the present disclosure.

In accordance with this and by way of specific example as shown in FIG. 1, the present disclosure is drawn to a system 10 of enhancing contrast of LED lighting, which can include a light-transmitting subsystem 20 and a light-receiving subsystem 70. The light-transmitting subsystem can include an LED light source 50, and a first reference oscillator 26 to receive a reference signal broadcast from a remote source 22, which in this instance can be a GPS-satellite, but can also be another remote source such as an RF source or other electromagnetic energy source capable of broadcasting a reference signal a suitable distance to be useful. The light-transmitting system can also include a synchronous modulation and power system 30 to cause a stream of modulated light-signal pulses (LED pulses) to be emitted from the LED light source in synchronous correlation with the reference signal. The light-receiving subsystem can include a light imager 100 (also referred to as a "light imaging system") to synchronously receive the stream of modulated light-signal pulses, a second reference oscillator 76 to receive the reference signal broadcast from the remote source, and a synchronous demultiplexing system 80 to convert the stream of modulated light-signal pulses to a stream of synchronous digital images in synchronous correlation with the reference signal. For example, a light imager receiving frequency, such as frame rate or rate and/or timing of image information acquisition and clearing, can be synchronized with a pulsed light frequency. The system can also include a demodulation image processor 150 to demodulate the stream of synchronous digital images and to further process the now demodulated digital images to generate enhanced contrast display imagery from the stream of synchronous digital images, and send the processed imagery to an output display 152. The output display is not shown specifically as part of the light-receiving subsystem 70, but in many examples, it can be present on the mobile carrier, or it can be located remotely with respect to the mobile carrier. The terms "demodulation image processor" or "processor to demodulate and image process" a stream of digital images can be used interchangeably, and may include multiple processes or processors, such as for example a processor and/or software to demodulate the demultiplexed images captured by the light imaging system, and an image processor and/or software to generate enhanced contrast display imagery from the digital images that were previously or simultaneously demodulated.

The term "enhanced contrast" relative to display imagery or video imagery or similar, for example, refers to imagery that is generated where light emitted from the LED light source has enhanced contrast (which may have the appearance on a video screen to a viewer as enhanced intensity) relative to background lighting. In aviation, this type of enhanced contrast display imagery could be referred to by the Federal Aviation Administration (FAA) as an Enhanced Vision System. In demodulating and further processing the enhanced contrast display imagery from the raw, but optically and/or digitally demultiplexed, stream of synchronous digital images, several exemplary steps could occur. For example, a set of sequential or otherwise patterned light imager-captured "optically detectable events" or "scene states" (e.g., LED light "ON" cycles, LED light "OFF" cycles, LED light "ON" with right-circular polarization cycles, second LED light "ON" cycles, etc.) can be collected in a linear or patterned combination of optically detectable events or scene states, and each scene state can be assigned a coefficient value. Affirmative LED light scene states (various "ON" optically detectable events) that are captured can be assigned a positive or negative coefficient value. In some examples, a background LED light scene state ("OFF" event) can also be used and given a negative coefficient value to subtract out the background light, e.g., −1, −2, etc. These coefficients can be assigned to enhance contrast. In one example, it may be desirable to assign the lights a brighter color or white, and the background color a darker color or black. This could, of course, be reversed with lights assigned a darker color or black and the background assigned a brighter color or white. This could be the way that the image is viewed, or the display could be configured to view the image in a negative view, thus correcting the inversely light contrasted imagery. Then, the linear combination of images with their coefficients can be mathematically processed using least squares regression analysis, or a maximum likelihood method, for example. Once demodulated in this manner and processed to use two or more of these scene states (typically per cycle) to provide the enhanced contrast imagery information from the LED light source, the imagery can be outputted to a video screen for viewing, either alone or with other collected video imagery. In some examples, the processing can include combining the enhanced contrast imagery with more standard imagery captured by lenses and/or imaging sensors similar to standard videography equipment, or in other examples, the enhanced contrast imagery can be combined or fused with various types of symbology, e.g., avionics symbology, or infrared enhanced imagery of the ground (or other area where an mobile carrier operator may be looking), or other types of imagery that would be useful to a mobile carrier operator, e.g., an in-cockpit pilot, a remote aircraft pilot, a ship captain or crew, a train operator, etc.

It is further noted that in FIG. 1 and FIGS. 2, 3, 4, etc., hereinafter, dashed arrows are used generally to depict pulsed light-signal as opposed to control, power, or data signal, which is shown using solid lines. More specifically, dashed directional arrows are generally used to indicate pulsed optical signal (ultraviolet, visible, or IR), such as the stream of modulated light-signal pulses described in accordance with the present disclosure. Solid line arrows, on the other hand, typically depict electrical or other control/power signal (wired or wireless) that is used to control and/or power the synchronous emission of pulsed LED light at the light-transmitting subsystem, or to synchronously control/power various optical demultiplexers, light imagers and their imaging sensors thereof, image processing after imaging, etc., at the light-receiving subsystem. Furthermore, the signal sent by the remote source, e.g., satellite or RF source, is shown using broken and dotted lines, indicating electromagnetic signal that may or may not be at or near the light spectral region, but that is distinguishable in function from the optical light-signal used to send modulated light or optical information between subsystems. In the specific example of FIG. 1, the dashed lines are shown connecting the LED light source 50 to the light imager 100, but there are examples where the optical filters and/or synchronous optical demultiplexer(s) can also be used to process the optical signal prior to being received by the light imager, as described in more detail hereinafter.

The terms "synchronous correlation," "synchronous," "synchronize," or other similar terms, refer generally to various systems, subsystems, and/or individual components within a subsystem that can be harmonized together so that the equipment therein operates or is configured to operate in agreement with other systems, subsystems, and/or individual components. This agreement can include light-transmitting pulse frequency, light-receiving frequency agreement, and relative timing agreement, but can also be supplemented with wavelength agreement, intensity agreement, radiance agreement, bandwidth agreement, phase agreement, polarization agreement, etc. For example, on a system level, a light-transmitting subsystem can operate or be configured to operate in synchronous correlation with a light-receiving subsystem, thereby matching (or operationally matching) certain light-transmitting properties from any of a number of categories with corollary light-receiving properties in a synchronous manner. As a specific example, by matching the timing and light-signal pulse frequency from the LED light(s) of an LED light source with the timing and light-receiving frequency, e.g., frame rate or image acquisition/clearing rate, of the imaging sensor(s) of a light imager, synchronous correlation can be said to have occurred. In further detail, additional synchronous optical devices can also be present at either or both of the light-transmitting subsystem and/or the light-receiving subsystem. For example, a synchronous optical multiplexer can be present at the light-transmitting subsystem and/or a synchronous optical demultiplexer can be present at the light-receiving subsystem. These are optical devices that can be used in addition to the LED light(s) used to transmit the light-signal and the imaging sensor(s) used to receive the light-signal. Regardless of how many systems or devices are being operated in synchronous correlation with one another, they can be synchronized, in one example, using a common reference signal of some type (particularly with bistatic systems) to coordinate all of the light-transmitting and light-receiving subsystems (and components thereof) synchronously together. With monostatic systems, on the other hand, where all of the devices may be present on single mobile carrier, e.g., with light retro-reflection being used, synchronous correlation between the various light-transmitting and light-receiving subsystems (and components thereof) can be correlated by more direct communication onboard the mobile carrier, though in some instances a common reference signal can also be used. As a note, whether referring to a "relative high frequency signal" that is broadcast as a "reference signal," or referring to synchronous relative low frequency signal converted therefrom, both of these two types of signals can be themselves correlated with one another in a synchronous manner, and thus, it is accurate to refer to any of the systems, subsystems, device components, and/or software described herein as being "synchronously correlated" with either type of signal, e.g., reference signal and/or synchronous relative low frequency signal(s), as well as to any other system, subsystem, component device, and/or software that is also operated synchronously therewith. That being said, there may be examples where individual component devices are operated with different timings, phases, gate times, pulse frequencies, wavelengths, etc., but are still operated to synchronously function or operate together in order to enhance imagery contrast. For example, a synchronous image acquisition controller can be said to be in synchronous correlation with a GPS reference signal, even though the synchronous image acquisition controller is used to convert the reference signal to one or more synchronous relative low frequency signals that may be used to control two different components, e.g., two different imaging sensors. Thus, in accordance with examples of the present disclosure, by internally and individually synchronizing the respective subsystems and relevant components thereof, and by also synchronizing the two subsystems to one another (such as by using a remote reference signal or some other communication common to both subsystems), the systems of the present disclosure can be operated "synchronously" with enhanced LED light contrast relative to background lighting.

Some components that are synchronous components may on occasion be referred to explicitly as "synchronous" and on other occasions without the "synchronous" preface, and thus, the context can dictate whether a component is a synchronous component or merely a passive optical device, like a passive filter or lens, for example. To illustrate, a "synchronous wavelength demultiplexer" may be referred to as a "wavelength demultiplexer" in some occasions, but in context describes active optical separation controlled by a synchronous image acquisition controller, and thus, this demultiplexer is understood to be synchronous. Likewise, the synchronous image acquisition controller has multiple functions, one of which includes synchronously controlling a light imager. Thus, the image acquisition controller can sometimes be referred to simply as an "image acquisition controller," and is still considered to be a synchronous component (or system).

In further detail, two devices can be considered to be in synchronous correlation with one another, even if some or all of the properties of the correlation do not match exactly. For example, an LED light may emit during 50% of the time of a single duty cycle, whereas the imaging sensor used to gather the light emitted from the LED light may be in a capturing mode for only 40% of the time during that same duty cycle. These two components would still be considered synchronized with one another because they would still be configured to operate together synchronously to enhance image contrast. Thus, terms like "match," "frequency matched," "synchronously matched," or the like, do not infer exact matching, but rather operational matching that results in improved image contrast performance.

The term "reference signal" refers to a signal from a remote source, such as a remote broadcasting source, e.g., RF source, satellite source, etc. The reference signal can be received at the respective subsystems by a "reference oscillator," e.g., one at the light-transmitting subsystem and one at the light-receiving subsystem for bistatic systems, or one at the mobile carrier where both subsystems are onboard for monostatic systems. By both subsystems using the same reference signal, both subsystems can be synchronized together based on the common reference signal. Typically, a reference signal that is very stable and has frequency that is relatively high can be converted to a more useable relatively low frequency signal(s) for purposes of controlling the respective subsystems and synchronous devices of the present disclosure. An example of a reference oscillator is a quartz or rubidium oscillator that can be used to receive timing and other reference signal information from various types of sources, such as an RF source or a satellite source. With a satellite (GPS) source, a GPS-disciplined reference oscillator can be used. Once the relative high frequency signal is received from the remote broadcasting source, the reference signal can be down converted using an intermediate device such as a synchronous modulation signal generator (at light-transmitting subsystem) or an image acquisition controller (at light-receiving subsystem) to form one or more synchronous relative low frequency signal at each subsystem location.

The term synchronous "relative low frequency signal" refers to one or more signal generated by a signal generator (described as a synchronous modulation signal generator at the light-transmitting subsystem, or as a synchronous image acquisition controller at the light-receiving subsystem). The synchronous relative low frequency signal can be electromagnetically transmitted wirelessly or using electrical wires and can be processed appropriately using various types of circuitry or devices that may be implemented to control the LED light source via its power supply controlled by the synchronous modulation signal generator at the light-transmitting subsystem and/or the light imager via the image acquisition at the light-receiving subsystem. To illustrate, at the light-transmitting subsystem, by way of example, the synchronous relative low frequency signal can be further synchronously encoded using processors or circuitry relative to the type of LED light pattern that is to be emitted (and ultimately synchronously received) in accordance with systems of the present disclosure. For example, at the light-transmitting subsystem, the synchronous relative low frequency signal (which by definition includes multiple synchronous relative low frequency signals) generated by the synchronous modulation signal generator can be used to synchronously generate a pattern (of any type) of power pulses to one LED light or independently to two or more respective LED lights; or to generate power pulses of varying radiance, e.g., 0% (OFF), 50% or some other fractional radiance (ON), and 100% (ON) to one or more LED light; or to synchronously control a synchronous optical multiplexer, such as an electro-optically actuated homogeneous circularly-polarizing filter; etc. At the light-receiving subsystem, decoding of the LED light-signal can occur using the synchronous relative low frequency signal (or multiple signals) generated by the synchronous image acquisition controller, which can be used to control light imager frame rate(s) for one or more imaging sensor, e.g., image acquisition and clearing timing, or to control a synchronous optical multiplexer timing or gating, or both. Thus, these multiple devices or types of devices can be controlled by one relative low frequency signal or by multiple synchronous relative low frequency signals, and in both circumstances, this can generically be referred to as "a (first or second) synchronous low frequency signal."

The terms synchronous "modulation signal generator" and synchronous "image acquisition controller" can be considered analogous component devices used with two different subsystems for controlling synchronous light-transmitting activity (at or near the ground in the case of landing sites, or at other relevant target locations with respect to other mobile carrier fields) and synchronous light-receiving activity (within an aircraft or other mobile carrier), respectively. In many examples, both can be used to down convert the relative high frequency signal received by a reference oscillator (from a remote or broadcasting source) to a synchronous relative low frequency signal(s). Furthermore, however, the synchronous modulation signal generator (using one or more of its down converted synchronous relative low frequency signals) can control, for example, synchronization of LED light-signal transmission, e.g., pulses frequencies, wavelength emissions, radiance of emissions, phases, optical multiplexing devices such as oscillatory polarizers, etc. The synchronous image acquisition controller (using one or more of its down converted synchronous relative low frequency signals), on the other hand, can control light imager frame rate(s) for one or more imaging sensor, e.g., cyclical image acquisition and clearing, optical multiplexer timing or gating, etc. The common reference signal, which can be used by both the synchronous modulation signal generator and synchronous image acquisition controller at both respective subsystems, can allow for synchronization between the two subsystems generally, and more specifically, from component device and/or software to other component devices and/or software that may be present throughout the system as a whole where operation would benefit from synchronization. In monostatic systems, the common reference signal can be used as well, but in some examples, more direct communication between the two subsystems and/or individual component devices and/or software within each subsystem can alternatively be used.

The term synchronous "optical multiplexer" and synchronous "optical demultiplexer" each refer to any optical device that can synchronously channel or filter light when operated using a synchronizing signal, or when otherwise synchronized through more direct communication. The optical multiplexer can be associated with the light-transmitting subsystem, and more particularly, in some examples can be optically associated with the LED light source in some manner, e.g., synchronous polarization multiplexer, synchronous bandpass multiplexer, etc. The optical demultiplexer can be associated with the light-receiving subsystem, and more particularly, in some examples, can be optically associated with the light receiver assembly and/or the light imager, e.g., synchronous wavelength demultiplexer such as a synchronously controllable digital micro-mirror (DMD) device, synchronous polarization demultiplexer such as a synchronously controllable homogeneous circularly-polarizing filter, synchronous bandpass filtration, etc. These multiplexers and demultiplexers can be said to be "active" optical devices that are "electro-optically" operated or actuated (which includes electromechanically optically actuated devices). Thus, the term "synchronous" also indicates that a particular device is an "active" optical device that may be electro-optically actuated, where applicable.

The term "passive" associated to certain optical devices indicates that the specific device is not synchronized by the synchronous systems, subsystems, component devices, or software described herein. It can work together with synchronous components, but of itself, is not a synchronous device. These optical devices, however, can provide enhanced transmitting and/or receiving properties to the stream of light-signal pulses described herein, including providing passive encoding and decoding of information, bandwidth filtration, polarization to remove background light or noise light, optics to collimate or expand light-signal pulses, optics to redirect or split light-signal pulses, etc. Examples of a few passive optical devices can include beam splitters (color separation beam splitters), reflectors (mirrors, parabolas, etc.), beam expanders, light refractors (prisms, etc.), polarizers, bandpass filters, etc., that are not optically active or electro-optically synchronously controlled per se, but that can still be used to provide enhanced optical properties, or in some specific arrangements, can be used in conjunction with an active demultiplexer or even as part of a passive optical demultiplexer arrangement, e.g., a beam splitter used to separate a stream of modulated light-signal pulses into two beams, each of the now separated beams passing through a narrow bandpass filter appropriately selected to correspond with one (or the other) of two wavelengths of light.

Figure 2:
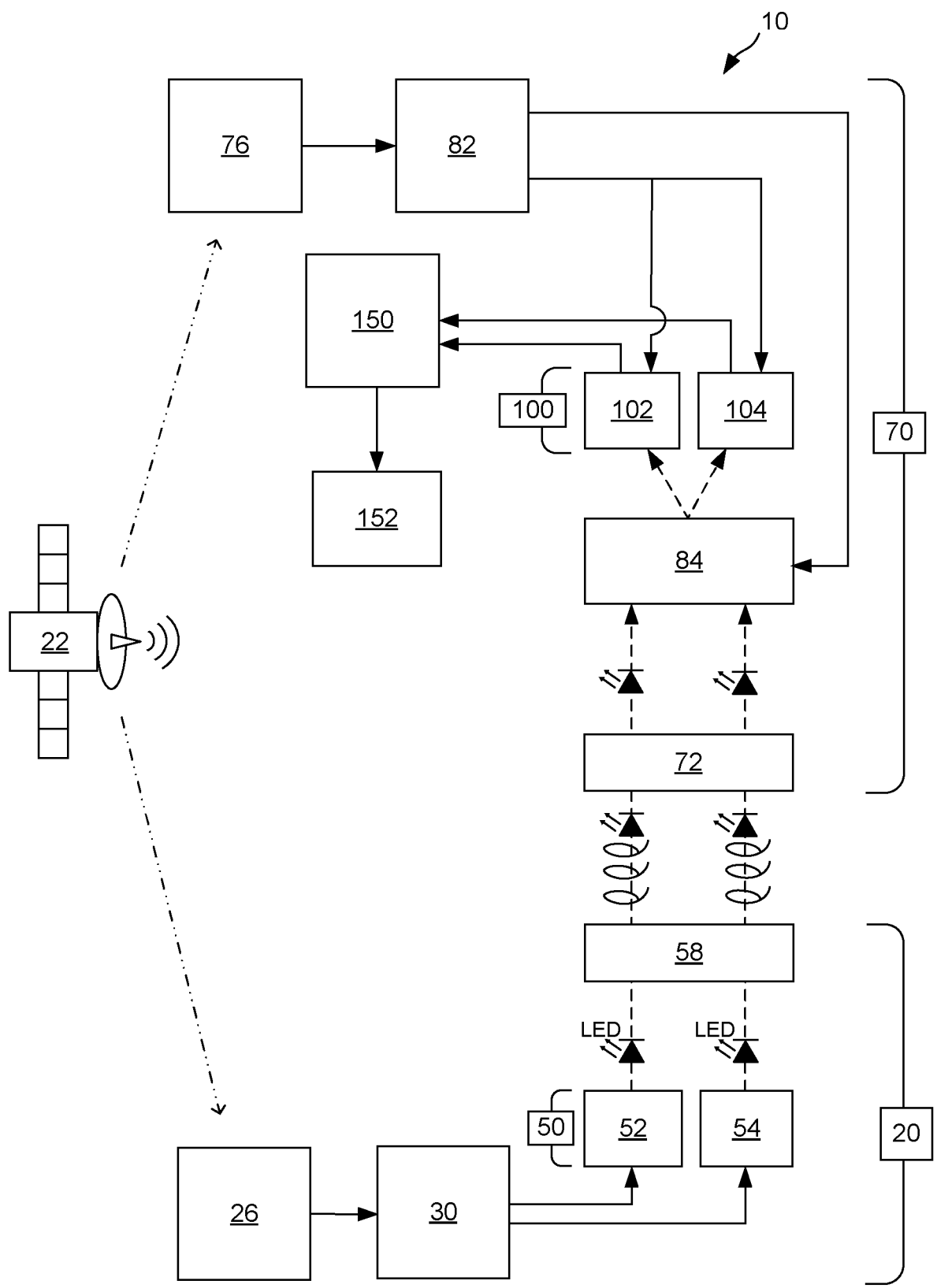
FIG. 2 is a component diagram of an example system for enhancing contrast of LED lighting, including example light-transmitting and light-receiving optics associated with sending and receiving a stream of modulated light-signal pulses in accordance with the present disclosure.

Returning now to the FIGS., in another more specific example, and as shown in FIG. 2, a system 10 of enhancing contrast of LED lighting relative to background lighting can include a light-transmitting subsystem 20 and a light-receiving subsystem 70. The light-transmitting subsystem can include an LED light source 50 that includes a first LED light 52 to emit a first wavelength of light with a first center-emission wavelength, and a second LED light 54 to emit a second wavelength of light with a second center-emission wavelength that is offset from the first center-emission wavelength. This light-transmitting subsystem can also include a first reference oscillator 26, which can be a first GPS-disciplined oscillator, to receive a reference signal broadcast from a remote or broadcasting source 22, which in this example can be a GPS satellite. Also included in this example light-transmitting subsystem is a synchronous modulation and power system 30 which, for example, can include a synchronous modulation signal generator (not shown, but shown in FIG. 3) to convert the reference signal from a synchronous relative high frequency signal to a first synchronous relative low frequency signal, and to provide synchronized power pulses to the first LED light and the second LED light in synchronous correlation with the first synchronous relative low frequency signal to generate a stream of modulated light-signal pulses that includes a first (pulse frequency modulated) wavelength of light and a second (pulse frequency modulated) wavelength of light. (A stream of modulated-light-signal pulses can include two wavelengths of light, the stream collectively can also be said to include modulated wavelength signal that can be demultiplexed and demodulated at the receiving end of the system). Thus, in this example, the stream of modulated light-signal pulses can include signal that is both intensity and wavelength modulated. In one example, the synchronized power pulses can be generated, in part, by a DC power converter and a power controller (not shown, but more specifically shown in FIG. 3). The light-transmitting system can also include, for example, an output optic (not shown, but shown in FIG. 3) to collimate the stream of light-signal pulses, and in other examples, a first polarizing filter 58 can be optically associated with the LED light source, e.g., a homogeneous circularly-polarizing filter. Both of these optical features will be described in greater detail hereinafter.

In further detail regarding the system shown in FIG. 2, the light-receiving subsystem 70 can include a light receiver assembly (not shown, but shown in FIGS. 4 and 8) to optically receive the stream of modulated light-signal pulses from the LED light source, and a light imager 100 to receive the stream of modulated light-signal pulses from the light receiver. In one example, the light imager can include a first imaging sensor 102 to sense the first modulated wavelength of light and a second imaging sensor 104 to sense the second modulated wavelength of light. In another example, a single imaging sensor can likewise be configured to receive and independently detect both wavelengths of light. Other optical devices can also be included, such as, for example, a passive second polarizing filter 72 and/or a synchronous optical demultiplexer 84, e.g., electro-optical actuated synchronous homogeneous circular polarizer or a synchronous wavelength demultiplexer. An example synchronous wavelength demultiplexer can include a synchronous digital micro-mirror (DMD) device for optically separating or optically demultiplexing multiple wavelengths of light by directing the stream of light along one or more optical paths and delivering it (or each path) to one or multiple imaging sensors, which may also include passing the optical paths through one or more optical filters, e.g., narrow bandpass filters, prior to delivery to the imaging sensor(s). The light-receiving system can also include a second reference oscillator 76, such as a GPS-disciplined oscillator, to receive the reference signal broadcast from the remote or broadcasting source 22, which can be a GPS satellite in this example.

A synchronous demultiplexing system (shown at 80 in FIG. 1, but shown as a series of individual component devices in this example) can also be present, which essentially includes the various synchronous component devices that interact with the light imager in the collection of light imagery emitted from the light-emitting subsystem, e.g., a synchronous image acquisition controller 82, and in this specific example, a synchronous optical demultiplexer. The synchronous image acquisition controller can have several functions, including converting the reference signal received by the second reference oscillator from a relative high frequency signal to a synchronous relative low frequency control signal(s), and to cause the stream of modulated light-signal pulses to be converted to a stream of synchronous digital images in synchronous correlation with the second synchronous relative low frequency signal. For example, the synchronous image acquisition controller can also be used to control the timing and the light-receiving frequency, or frame rate, to match or otherwise synchronize with the timing and pulse frequency of emitted light. In some examples, when a synchronous optical demultiplexer 84 is present (to optically interact with the stream of modulated light-signal pulses prior to being received by the light imager), the image acquisition controller can also synchronously control this device component. To illustrate, in one example, a first imaging sensor 102 of a light imager 100 can be synchronized with pulses of light (emitted from first LED light) having a first wavelength, and the second imaging sensor 104 can be synchronized with pulses of light (from a second LED light) having a second wavelength. The image acquisition controller can thus act to synchronize the timing frequency or frame rate of the respective light imagers to coordinate with the pulse frequency of the LED lights. Furthermore, in this example, the image acquisition controller can also time or otherwise synchronize a synchronous optical demultiplexer, which in instance can be an optical wavelength demultiplexer, e.g., for separating the two wavelengths of light for example by synchronously channeling the respective wavelengths of light to the appropriate imaging sensor. An optically appropriate narrow bandpass filter (not shown herein, but shown in FIG. 8) may also be present at one or both imaging sensors.

In further detail, the system 10 of enhancing contrast of LED lighting can also include a processor 150 to demodulate and image process a stream of digital images received by the light imager and further process the image to generate enhanced contrast display imagery as previously described. The system can also include an output display 152, which may typically be on the mobile carrier, but in one example, can be transmitted to a remote location, such as to a remote drone pilot location, for example.

Figure 3:
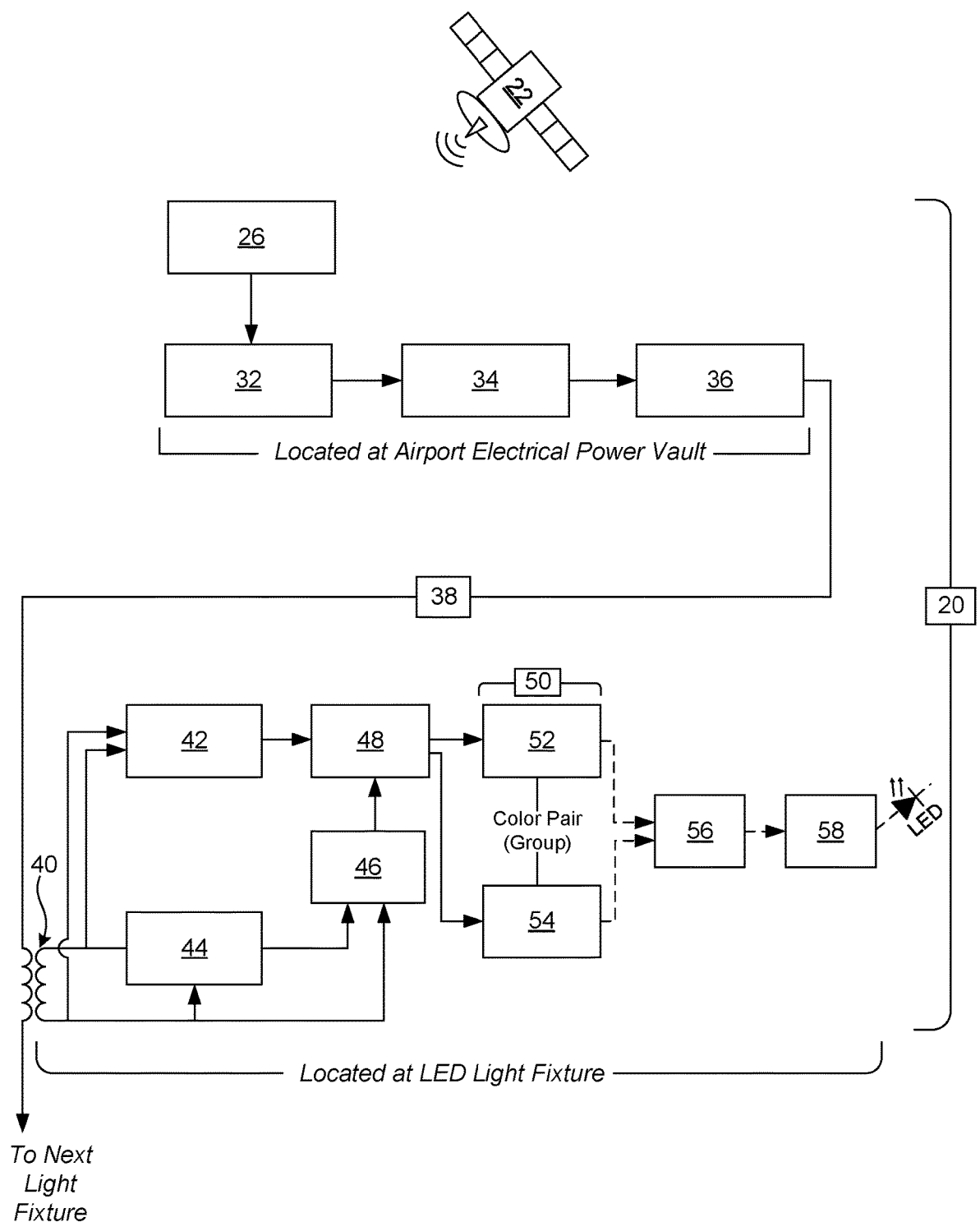
FIG. 3 is a component diagram of a more specific example airport-based light-generating subsystem of a bistatic airport and aircraft lighting system in accordance with the present disclosure.

In another more specific example and as shown in detail in FIG. 3, an airport-based, light-transmitting subsystem 20 can include an LED light source 50 including a first LED light 52 to emit a first wavelength of light with a first center-emission wavelength, and a second LED light 54 to emit a second wavelength of light with a second center-emission wavelength that is offset from the first center-emission wavelength. This system also includes a reference oscillator 26, which can be a GPS-disciplined oscillator to receive a reference signal broadcast from a remote or broadcasting source 22, which can be a GPS satellite in this example. The light-transmitting system can also include a synchronous modulation and power system (which collectively includes multiple device components in this example) including a synchronous modulation signal generator 32 as well as other circuitry and devices such as those shown at reference numerals 34-48. As these components represent one specific manner of configuring and installing a synchronous modulation and power system, they will be described hereinafter by way of specific example only. In short, however, the synchronous modulation and power system can be operated to convert (or synchronously down convert) a synchronous relative high frequency signal to synchronous relative low frequency signal(s), and to provide synchronized power pulses to the first LED light and the second LED light in synchronous correlation with the synchronous relative low frequency signal in order to generate a stream of modulated light-signal pulses that include a first modulated wavelength of light and a second modulated wavelength of light. Also shown in FIG. 3 by way of specific example is an output optic 56 and a first polarizing filter 58, which will be described in greater detail hereinafter.

Figure 4:
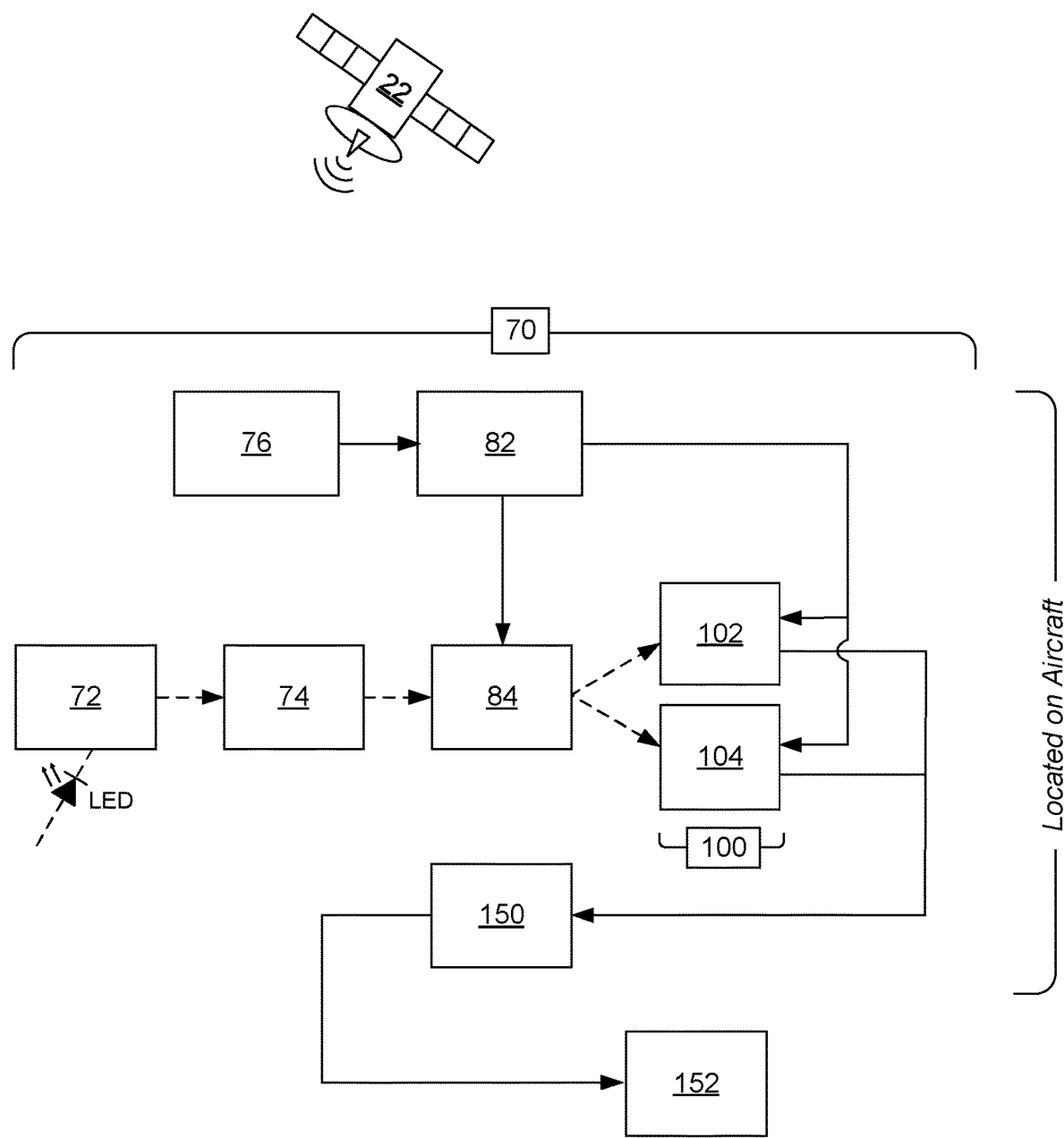
FIG. 4 is a component diagram of a more specific example aircraft-based light-receiving subsystem of a bistatic airport and aircraft lighting system in accordance with the present disclosure.

In yet another more specific example and as shown in detail in FIG. 4, an aircraft-based, light-receiving subsystem 70 can include a light imager 100, and a light receiver assembly 74 to optically receive and focus a stream of modulated light-signal pulses from an LED light source directly or indirectly onto the light imager. The stream of modulated light-signal pulses can include a first wavelength of light and a second wavelength of light. In some specific examples, the light imager may include only a (single) first imaging sensor 102, or it can include two or more imaging sensors, e.g., a first imaging sensor 102 and a second imaging sensor 104. As a note, the imaging sensors can be independently powered and/or controlled by the image acquisition controller, or can be commonly powered and/or controlled using common circuitry. In either case, both imaging sensors can be part of a light imager (or "light imaging system"), and thus, the term "light imager" should not be read to necessarily infer a common device per se, but rather a system that includes various circuitry and one or more imaging sensor(s), for example. For example, two imaging sensors can be included in a common device, or can be in two spatially separated devices that work collectively together. In both instances, the imaging sensors would still be considered to be part of the light imager or light imaging system. Furthermore, the imaging sensors of the light imager can be any of a number of imaging arrays that are useful for capturing light, including CMOS sensors, a CCD sensors, hybrid CCD/CMOS sensors (such as sCMOS sensors and other know hybrid sensors), etc.

The light-receiving subsystem 70 can also include a second reference oscillator 76, which in this case can be a GPS-disciplined oscillator to receive a reference signal broadcast from a remote or broadcasting source 22, which can be a GPS satellite in this example. A synchronous image acquisition controller 82 can be present to convert the reference signal from a synchronous relative high frequency signal to synchronous relative low frequency signal(s). Additionally, the synchronous image acquisition controller can be used to convert the stream of modulated light-signal pulses synchronously received by the light imager (using one or more of the relative low frequency electrical signal(s) to provide synchronization) to a stream of synchronous digital images generated from the first wavelength of light and the second wavelength of light (synchronously captured by the first imaging sensor 102 and the second imaging sensor 104, respectively). Thus, this synchronous demultiplexing can occur in accordance with and in agreement with the relative low frequency electrical signal also generated by the synchronous image acquisition controller. Furthermore, as shown in this FIG. is a second polarizing filter 72 and a synchronous optical demultiplexer 84, each of which being described in greater detail elsewhere hereinafter. Furthermore, the subsystem can also include a processor 150 to demodulate and image process a stream of digital images received by the light imager and further process the image to generate enhanced contrast display imagery as previously described. The system can also include an output display 152, which may typically be on the mobile carrier, but in one example, can be transmitted to a remote location such as to a remote drone pilot location, for example.

Figure 5:
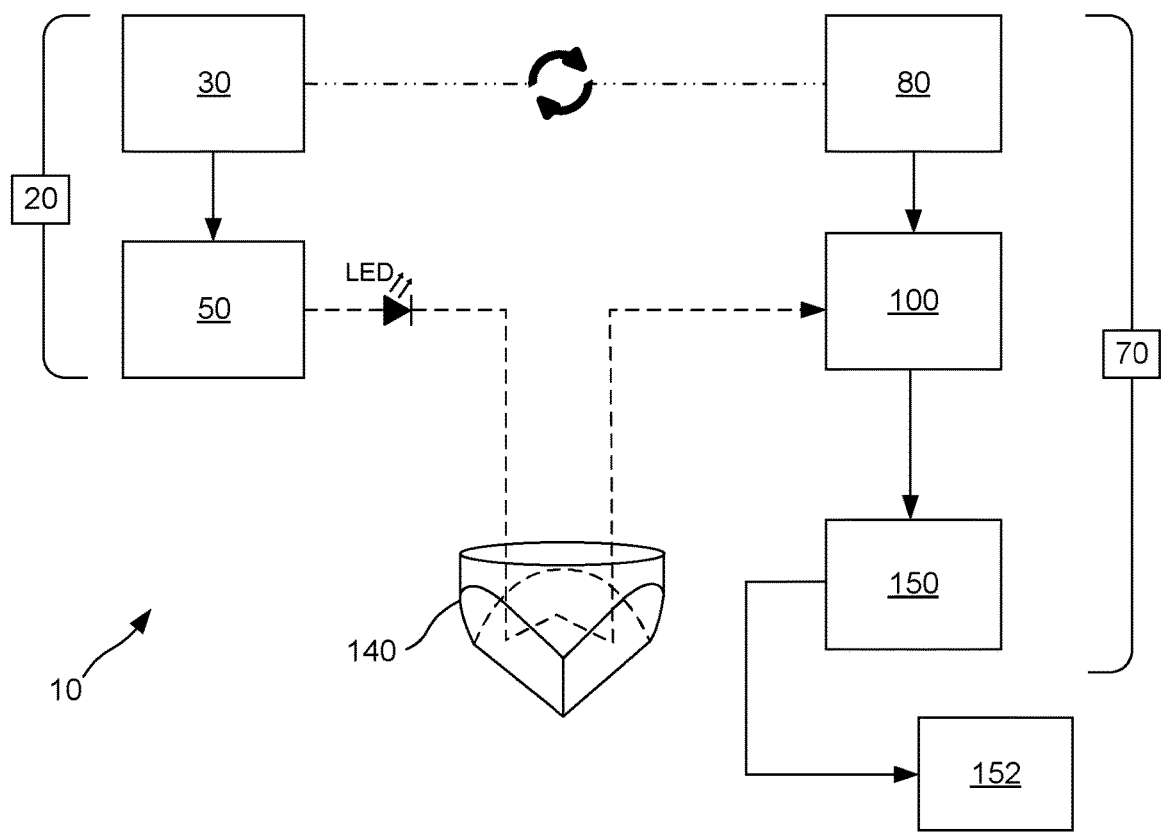
FIG. 5 is a component diagram of an example system for enhancing contrast of LED lighting using a monostatic mobile carrier lighting system in accordance with the present disclosure.

In another example, as shown generally in FIG. 5, a system 10 of enhancing contrast of reflected LED lighting on a mobile carrier (shown collectively as containing both subsystem 20 and subsystem 70) such as an aircraft, a water vessel, a land vehicle, a train, etc., can include a light-transmitting subsystem 20 and a light-receiving subsystem 70, both positioned on the mobile carrier. The light-transmitting subsystem can include an LED light source 50 and a synchronous modulation and power system 30 to power and generate a stream of modulated light-signal pulses from the LED light source in a first direction. The light-receiving subsystem 70 can include a light imager 100 to receive the stream of modulated light-signal pulses reflected from the first direction, and a synchronous demultiplexing system 80 to convert the stream of modulated light-signal pulses to a stream of synchronous digital images. In this example, the synchronous modulation and power system and the synchronous demultiplexing system can be configured so that when in operation, the stream modulated of light-signal pulses are synchronously timed and pulse frequency matched with the timing and light-receiving frequency of the light imager. A processor 150 (or demodulation image processor) to demodulate a stream of digital images captured by the light imager and to image process the demodulated stream of images to provide enhanced contrast display imagery. In one example, the system can further include a retroreflector 140, such as a corner cube reflector, for receiving the stream of modulated light-signal pulses and reflect the stream of light generally back from the retroreflector in the opposite direction. Generally, a corner cube reflector is a retroreflector that includes three mutually perpendicular flat surface panes that can reflect electromagnetic waves back toward the source.

The monostatic system of FIG. 5 can include many of the other specific device components, filters, software, etc., as described with any of the other bistatic systems. However, because both subsystems may be present on a common mobile carrier, there may be instances where a reference oscillator may not be present, or only a single reference oscillator may be present that controls both subsystems, for example. Furthermore, as with the bistatic examples, various types of filtration, polarization, and other optical enhancing components can be used as well, provided they can be acceptably used with a retroreflector or with other reflective systems. For example, circularly-polarized light may not reflect back in the same manner as originally emitted, and thus, adjustments can be made to the reflected polarized light, or a different type of polarization may be selected, such as linear polarization. As another example, though not specifically mentioned above, the synchronous demultiplexing system 80 may include an image acquisition controller that down converts a reference signal as previously described, or may otherwise communicate with the light-transmitting subsystem for synchronization therewith. The synchronous demultiplexing system can also control the light imager 100, including any imaging sensors thereof, controlled by the image acquisition controller, or can also include one or more optical demultiplexer that synchronously and optically process light prior to light imager synchronous capture, or can include any of a number of active or passive filters or other optical devices, e.g., beam splitters, micro-mirrors, etc.

Figure 6:
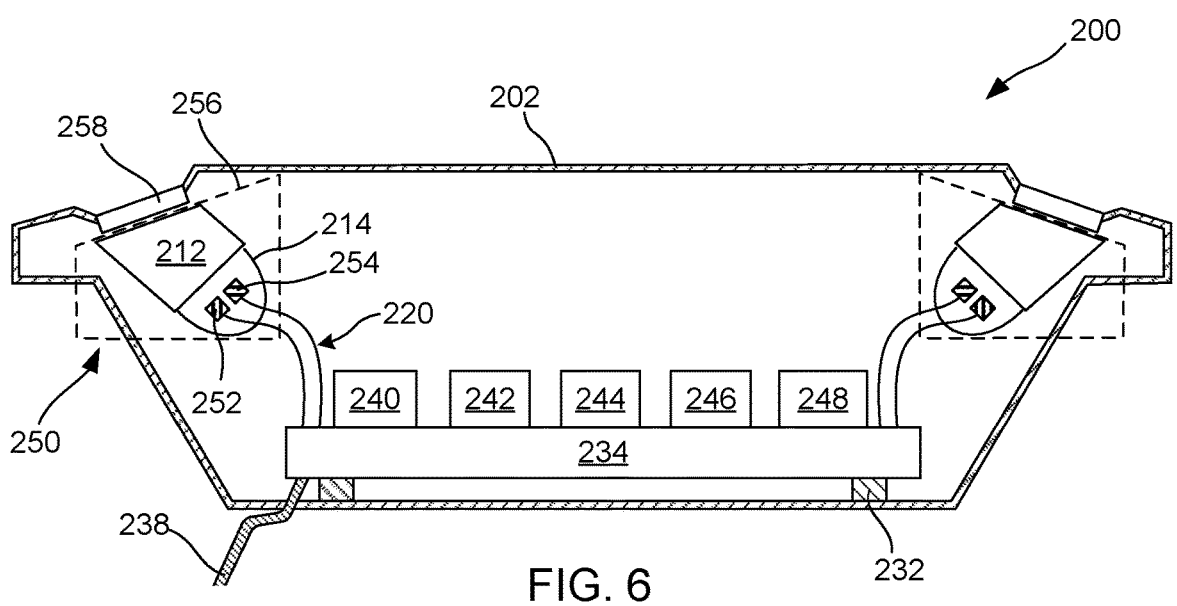
FIG. 6 is a diagram of an example runway LED light fixture adapted for use with the example bistatic lighting systems in accordance with an embodiment of the present disclosure.

In another example, as shown in FIG. 6, an LED light assembly 200 suitable to connect to an airfield series lighting loop 238 can include a fixture housing 202, an LED light source 250, and a synchronous modulation and power system, which can include one or more of the circuitry or devices shown as reference numeral 240, 242, 244, 246, and 248, for example. The light source can generate a stream of modulated light-signal pulses as a collimated beam of light in an upwardly angled orientation generally within a range of incoming aircraft glide path angles, e.g., about 2 to 4 degrees from horizontal for some commercial aircraft jetliners with landing speeds from 100 to 140 knots, or about 4 to 12 degrees for certain small aircraft with landing speeds ranging from 30 knots to 100 knots, for example. Other fixed wing aircraft that do not fit into these general categories can also benefit from the systems of the present disclosure. That being stated, an angular range of upwardly angled light-signal orientation from about 2 degrees to about 15 degrees should be wide enough to be effective for most types of fixed wing aircraft. As a note, term "LED light" includes any solid state diode light, including omnidirectional LED lights, laser diodes, super radiant diodes, or the like. Thus, if the objective is to provide emitted light commensurate with a reasonable glide path range of a fixed wing aircraft, e.g., 2 to 15 degrees, 2 to 12 degrees, 2 to 10 degrees, 3 to 10 degrees, etc., then appropriate output optics can be associated with a particular type of solid state diode, as may be appropriate. For example, an omnidirectional LED light can be collimated with an elliptical mirror and prism to focus or concentrate omnidirectional light. A laser diode, on the other hand, can utilize optics to widen a more inherently narrow beam of light, such as an optical beam expander. As a further note, angular modification of the direction of the beam of light-signal can be made for landing sites based on the intended aircraft or other carrier vehicle. For example, if being used for a helicopter, the angle of the beam can be adjusted commensurate with an often intended steeper approach angle.

In further detail, the light source can include a first LED light 252 and a second LED light 254 to generate the stream of modulated light-signal pulses. As mentioned, with each of the varied types of LEDs described above, the optics associated therewith can be accordingly modified as may be appropriate. Thus, the light source can include an output optic 256 to modify the stream of modulated light-signal pulses, which in this instance can concentrate the signal to form a collimated beam of light. For example, the output optic can include a parabolic reflector 214 and a prism 212 to collimate the stream of modulated light-signal pulses. If the LED light is a laser or other narrow light beam source, then a beam expander could be used rather than collimating optics. A first polarizing filter 258, such as a homogeneous circularly-polarizing filter (passive or synchronous) can also be included to encode the stream of modulated light-signal pulses with circular polarization.

In another example, the synchronous modulation and power system generally can include an isolation transformer 240 to transfer and limit AC electrical power received from the airfield lighting loop, an LED DC power converter 246 to convert the AC electrical power received through the isolation transformer to DC electrical power, and a synchronous power controller 248 to control emission timing and pulse frequency of the pair of LED lights in a coordinated and synchronously modulated pattern. Other features can include an electromagnetic interference filter 244 onboard the LED light assembly to filter out unwanted interference, and/or a power line-carrier communications modem 242. The circuitry or devices can be carried by a circuit board 234, such as a printed circuit board, supported by a standoff insulator 232, and electrically coupled to the light source by LED power leads 220.

As shown in FIG. 6, but not specifically notated with reference numerals, is a second LED light source electrically coupled to the synchronous modulation and power system as well. The second LED light source can be configured to generate a second stream of modulated light-signal pulses as a second collimated beam of light in an upwardly angled orientation generally within a second range of incoming aircraft glide path angles. The second LED light source can include a second pair LED lights, e.g., a third LED light and a fourth LED light, to generate the second stream of modulated light-signal pulses and a second output optic to concentrate the second stream of modulated light-signal pulses to form the second collimated beam of light. Thus, for example, the LED light source and the second LED light source can generate two diverging beams of light pointed in opposite directions along an x-axis to provide runway lighting in both directions along a single runway.

Figure 7:
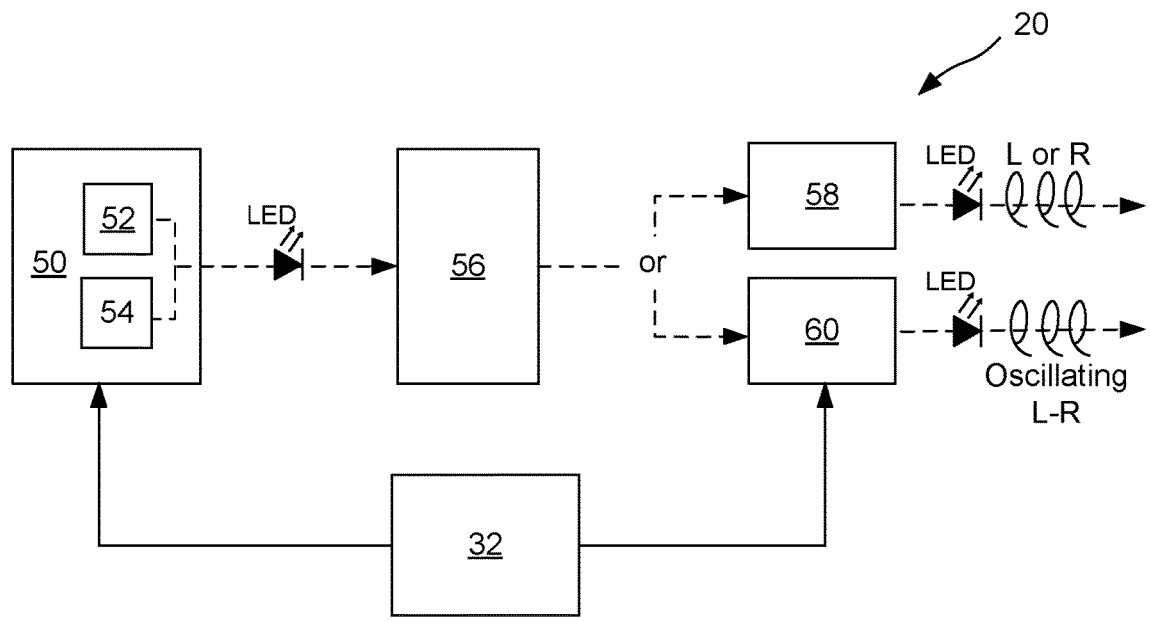
FIG. 7 is a component diagram of a more specific example of certain optics associated with a light-generating subsystem in accordance with the present disclosure.
Figure 8:
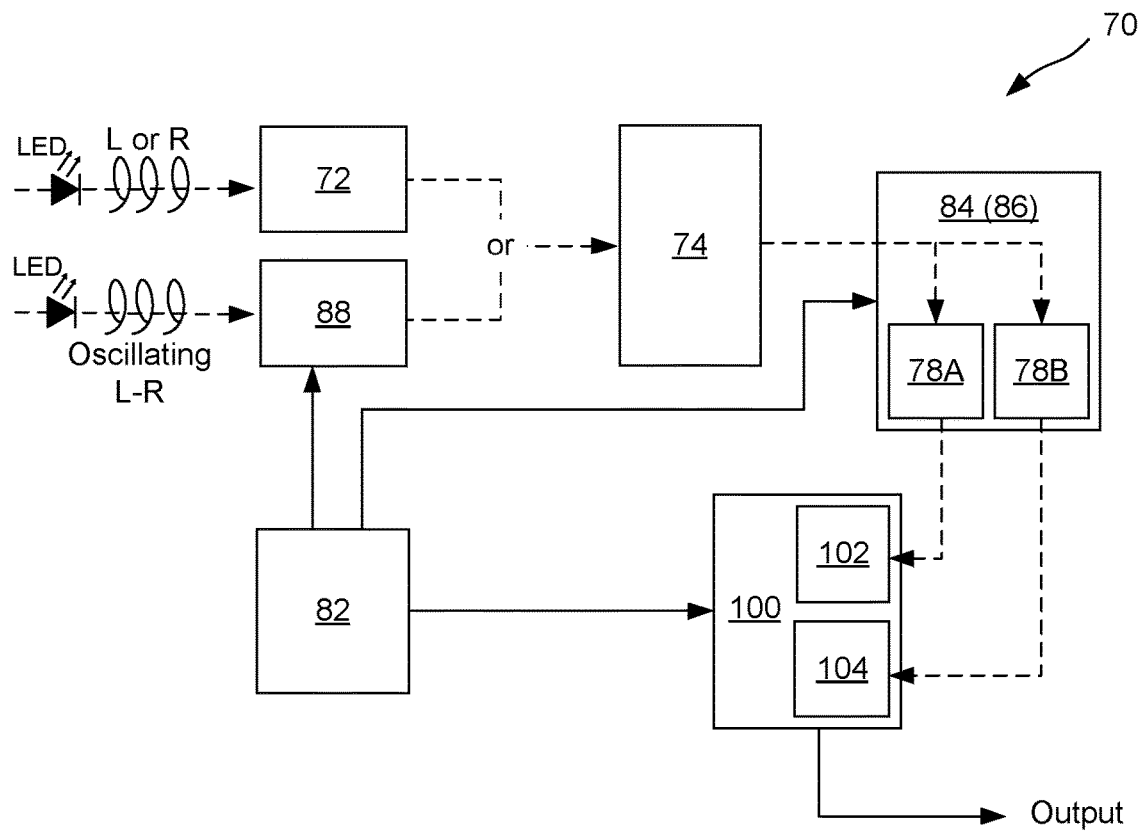
FIG. 8 is a component diagram of a more specific example of optics associated with a light-receiving subsystem in accordance with the present disclosure.

In another example, a more specific embodiment detailing example optical encoding and decoding (modulating and demultiplexing) of the stream of light-signal pulses is shown in FIGS. 7 and 8. FIG. 7, for example, provides a portion of a light-transmitting subsystem 20, detailing an example where an LED light source 50 includes a first LED light 52 and a second LED light 54 that is adapted to emit a stream of modulated light-signal pulses that include a first wavelength of light (from the first LED light) and a second wavelength of light (from the second LED light). The stream of modulated light-signal pulses can be encoded with time and pulse frequency modulation where the first LED light cycles between "ON" and "OFF," and the second LED light cycles between "ON" and "OFF." This can be an alternating pattern with little or no temporal overlap, or a more complex pattern, e.g., different radiances, differently timed cycles, three or more LED lights, different polarizations, etc., which can be controlled by the synchronous modulation and power system, and more specifically in this example, by a synchronous modulation signal generator 32. The stream of modulated light-signal pulses can be collimated to concentrate and provide directionality to the light using an output optic 56. On the other hand, if a laser or other LED light source is used that has a narrow beam, a beam expander could be used as well to generate a wider beam. In further detail, the LED light source can be optically associated with a first (passive) polarizing filter 58, such as a circularly-polarizing filter or a homogeneous circularly-polarizing filter; or the LED light source can be optically associated with an electrically actuated, synchronous homogeneous circularly-polarizing filter 60, which essentially acts a synchronous polarization multiplexer to be demultiplexed at the light-receiving subsystem, which can be electrically oscillated between left- and right-circular polarization. The electrical actuation can be achieved by replacing a quarter-wave-plate retarder of the polarizing filter with an electrically-driven photoelastic modulator to generate the stream of modulated light-signal pulses (with right- and left-circular polarization). Thus, encoding can occur by synchronously cycling one or more LED light pulses (on/off), synchronously cycling one or more light intensities (e.g., on high, on low, off), synchronously cycling left and right circular polarization, etc.

FIG. 8 provides further example detail regarding optics and decoding of the stream of light-signal pulses received at the light-receiving subsystem 79. In this example, polarized light can be received by a second polarizing filter 70, which in this example is a circularly-polarizing filter or a right- or left-homogeneous circularly-polarizing filter, to decode or allow to pass light with similar polarization applied to the stream of light-signal pulses from the first polarizing filter 58 (FIG. 7). In an alternative example, a second (light-receiving) synchronous polarization demultiplexer 88 can be used in synchronous correlation with the (light-transmitting) synchronous homogeneous circularly-polarizing filter 60 (or synchronous polarization multiplexer of FIG. 7). This second synchronous homogeneous circularly-polarizing filter can be synchronously controlled by the synchronous demultiplexing system, or more specifically as shown in FIG. 8, a synchronous image acquisition controller 82, which is also synchronously coordinated or correlated with the synchronous modulation signal generator 32 (FIG. 7). In further detail, a light receiver assembly 74 receives and focuses the stream of modulated light-signal pulses toward a synchronous optical demultiplexer 84, which in this instance can be a synchronous wavelength demultiplexer 86 since there are two wavelengths of light within the stream of modulated light-signal pulses. The synchronous wavelength demultiplexer can be an electro-optical device that can also be synchronized as part of the synchronous demultiplexing system, such as with the image acquisition controller. Essentially, the synchronous wavelength demultiplexer can optically separate the first wavelength of light from the second wavelength of light by timing the respective pulses of light from each wavelength. In one example, optically separated wavelengths of light-signal pulses can be further processed by narrow bandpass filters, 78A, 78B, to filter and/or narrow the bandwidth of the respective wavelengths of light for delivery to the light imager 100, which is also synchronously controlled by the synchronous demultiplexing system (and more specifically the image acquisition controller, in one example). Thus, the optically separated wavelengths of light can be respectively delivered and synchronously received by a first imaging sensor 102 and a second imaging sensor 104. In other examples, however, a single imaging sensor can be used that can be synchronously timed and sensitive to both wavelengths of light. As mentioned, the synchronous demultiplexing system can include a synchronous image acquisition controller which can also control the light imager and any synchronous optical demultiplexers that may be used, including in this example, the synchronous wavelength demultiplexer 86.

In another example, a method of enhancing contrast of LED lighting relative to background lighting can include emitting, using an LED light source at a light-transmitting subsystem location, a stream of modulated light-signal pulses; receiving, using a light imager at the light-receiving subsystem location, the stream of modulated light-signal pulses; and synchronously correlating a power pulse frequency and timing applied to the LED light source with light-receiving frequency and timing applied to the light imager. Additional steps can include demodulating the stream of modulated light-signal pulses synchronously received by the light imager to generate a stream of synchronous digital images; and processing the stream of synchronous digital images to generate enhanced contrast display imagery. In this specific example, the enhanced contrast digital imagery can be provided as a video image that includes enhanced contrast light originating from the LED light source relative to background lighting that did not originate from the LED light source. The light-transmitting subsystem and the light-receiving subsystem can be at remote locations with respect to one another, or both can be on a mobile carrier, and the method can further comprise reflecting the stream of modulated light-signal pulses from the LED light source to the light imager, e.g., using a retroreflector such as a corner cube reflector. The step of synchronously correlating the power pulse frequency with light-receiving frequency can include the use of a common reference signal.

In each of these system and method examples, whether specifically mentioned or not, the light-transmitting subsystem and the light-receiving subsystem (or corresponding method step) can include synchronous or passive polarizers (or polarization) for synchronously or passively encoding/decoding the stream of modulated light-signal pulses. The polarizer filters can be circularly-polarizing filters that are oriented the same way to allow both sending and receiving the same light polarization. The first circularly-polarizing filter can be optically associated with the LED light (or when two or more LED lights are used in an LED light pair or group, one or more of the first LED light or the second LED light). The second circularly-polarizing filter can be optically associated with the light receiver assembly (which may include a first imaging sensor and a second imaging sensor). For example, the first circularly-polarizing filter can optically encode the stream of modulated light-signal pulses with right- and left- (or right- or left-) circularly-polarized light, and the second circularly-polarizing filter can accept and decode the right- and left- (or right- or left-) circularly-polarized light applied to the stream of modulated light-signal pulses while rejecting unpolarized or linearly-polarized light. If a synchronous polarization demultiplexer is used, a corresponding synchronous polarization multiplexer at the LED light source can also be used and oscillated in a coordinated manner. In another example, a synchronous polarization multiplexer (optically associated with the LED light source) or a synchronous polarization demultiplexer (optically associated with the light imager) can be used in conjunction with a passive right- or left-polarizer to generate light "pulses" from a light emission, even a continuous light emission. For example, by oscillating right- and left-polarization at either the transmitting or receiving end, a passive polarizer at the other end would only allow for light transmission/reception when the polarization is matched, and would reject light when the polarization is out of phase.

It is also noted that when discussing the LED contrast enhancing systems and related methods herein, each of these discussions can be considered applicable to other examples whether or not they are explicitly discussed in the context of that example. Thus, for example, when discussing a GPS-disciplined oscillator in the context of an LED contrast enhancing system, such disclosure is also relevant to and directly supported in the context of various methods and other similar examples that also may use a GPS-disciplined oscillator, and vice versa.

Furthermore, for simplicity and illustrative purposes, the present disclosure is described by referring mainly to examples in aviation, including civilian and military aviation, fixed wing aircraft, helicopters, and other aviation aircraft. However, these same principles can be implemented in other contexts, such as in civilian or military land vehicle and/or maritime applications, including offshore oil rigs and underwater exploration and construction operations, etc. Thus, any specific reference to aviation, airfields, aircraft, etc., is intended to provide direct support for other contexts, including those where there is a moving mobile carrier with a light-receiving subsystem onboard, and any type of second remote (bistatic) or even onboard (monostatic) light-transmitting subsystem location, e.g., water vessel and ports, obstructions, or open sea; train and train station; underground mining operation; fire and other rescue endeavors; land vehicle and safety or navigation lighting; etc. In other words, any vehicle or mobile carrier with a monostatic system onboard, or any vehicle or mobile carrier with the light-receiving subsystem portion of the bistatic system onboard where there is a corresponding light-transmitting subsystem available for use, can benefit from the systems and methods disclosed herein. Furthermore, in the following description, numerous specific details are set forth in order to provide a thorough understanding of the present disclosure. It will be readily apparent, however, that the present disclosure can be practiced without limitation to many of these specific details. In other instances, certain methods, structures, or applications are not specifically described in detail so as not to unnecessarily obscure the present disclosure.

In further detail, when referring generically to an "airport," this includes, by definition, controlled airports, uncontrolled airports, airstrips, heliport, aircraft carrier landing areas, water landing areas, open field landing areas, or any other area where aircraft of any type may land, for example. Likewise, the term "aircraft" includes any type of aircraft, including fixed wing aircraft, helicopters, paragliding or hang-gliding apparatuses, hot-air balloons, ultralights, spacecraft, rockets, seaplanes, airships, drones, or the like.

With these general examples in mind, as mentioned, the present disclosure is drawn generally to LED contrast enhancing systems (relative to back ground lighting) and methods for improving the visibility of LEDs, which can be particularly useful in low visibility conditions, e.g., visibility-reducing atmospheric conditions such as fog, smog, dust, smoke, storms, etc. Thus, because LED contrast enhancement can be provided using various technological solutions, various forms of "light" (such as various wavelengths of light in various spectral regions, or various pulsing frequencies, or various polarizations, etc.), can be used that may not be otherwise visible or distinguishable to the naked eye. For example, in addition to LED light that can emit visible light, e.g., from about 400 nm to about 700 nm, other light spectral regions can be used, including ultraviolet (UV) light, e.g., from about 100 nm to about 400 nm; or infrared (IR) light, e.g., near IR from about 700 nm to about 2500 nm; or near IR from about 2500 nm to about 5000 nm.

In specific examples of the present disclosure, the LED contrast enhancing systems and methods can exploit one or more key photonic property of LED lights, including (1) the potential for rapid on/off switching (e.g., in less than 10 microseconds); (2) stable peak emission wavelengths (with less than 2% drift); and/or (3) narrow-bandwidth emissions (relative to the wavelength selected for use).

With respect to rapid on/off switching, pulse frequencies can be selected for use with LED light sources that are above the visual flicker fusion rate for the human eye, which is about 100 Hz. The flicker fusion rate represents a pulse frequency where most humans would not perceive that a light is cycling or pulsing. For example, films cycle at about 30 frames a second and high frame rate films cycle at about 60 frames per second. Most computer monitors have a refresh rate of about 60 Hz, and high end monitors have a refresh rate of 120 Hz. Thus, rapid on/off switching above about 100 Hz is typically fast enough to be imperceptible by most humans. Example ranges for pulse frequencies (and corresponding light imager receiving frequencies) can be from 100 Hz to 130,000 Hz, from 100 Hz to 48,000 Hz, from 100 Hz to 1000 Hz, from 100 Hz to 500 Hz, from 150 Hz to 48,000 Hz, from 150 Hz to 1000 Hz, from 150 Hz to 500 Hz, from 200 Hz to 1000 Hz, or from 200 Hz to 500 Hz, for example. Thus, for definitional purposes, when referring to a "reference signal," such as an RF or GPS synchronization signal, the term "relative high frequency signal" refers to frequency signals that are greater than 130,000 Hz, and typically much greater than 130,000 Hz, e.g., more than a full order of magnitude, such as about 10 MHz. Thus, the "relative low frequency electrical signal" that is down converted from the relative high frequency signal can be frequency signals from 100 Hz to 130,000 Hz, and more typically from 100 Hz to 48,000 Hz.

Regarding the stable peak emission wavelengths, stable wavelengths can provide the ability to send and receive predictable wavelengths of light with any appropriate optical equipment, including appropriate narrow bandpass filters, and appropriate light imagers suitable for receiving the wavelengths of light at or near the peak emission wavelength. This can be particularly beneficial when emitting and receiving multiple wavelengths of light within the stream of modulated light-emitting pulses. For example, an LED light source can include a first LED light to emit a first wavelength of light and a second LED light to emit a second wavelength of light that is different than the first. In this example, the first wavelength of light can include a first bandwidth and a first center-emission wavelength, and the second wavelength of light can include a second bandwidth and a second center-emission wavelength. Thus, the first center-emission wavelength can be offset from the second center-emission wavelength by at least one-half of the first bandwidth or the second bandwidth, which can be the narrower of the two bandwidths, or the broader of the two bandwidths. The two wavelengths of light can be in the visible region, the infrared region, the ultraviolet region, or in any two different regions, e.g., visible and infrared, visible and ultraviolet, infrared and ultraviolet. In further detail, two or more wavelengths of light can be used (with two or more LED lights positioned immediately proximal to one another, e.g., within about 2 cm), to generate a color group that pulses and generates an average perceived color that can be any color that is desired, such as the colors of light typically used in air or sea navigation, e.g., white, red, green, amber, yellow, or blue light. As an example, red light, green light, and blue light can be combined to generate white light; or blue light and yellow light can be combined to generate white light. For clarity, the term "perceived color" refers to human viewers using their natural eyes without added equipment. The equipment of the present disclosure, on the other hand, can distinguish between the two or more wavelengths of light being emitted, even if they are not perceptible to the human eye. That is one reason why the two or more wavelengths of light can be emitted, e.g., so that the light-receiving subsystem can distinguish the two wavelengths and use that added information to generate the enhanced contrast images described herein. The perceived color, on the other hand, is generated for use primarily during normal visibility conditions where pilots (or other vehicle operators in other circumstances) may use color or white light for general navigation or other purposes without the systems of the present disclosure.

With respect to bandwidth more specifically, in the visible spectral region, a bandwidth, e.g., full width at half maximum intensity, for the stream of modulated light-signal pulses can be emitted at an optical bandwidth of 50 nm or less, or 40 nm or less, 30 nm or less, or 25 nm or less, for instance. In the infrared spectral region, a bandwidth for the stream of modulated light-signal pulses can be 200 nm or less, 150 nm or less, 100 nm or less, or 50 nm or less. For example, in the near-infrared spectral region, the bandwidth can be 80 nm or less, 60 nm or less, or 40 nm or less; in the short-wave infrared spectral region, the bandwidth can be 100 nm or less, 75 nm or less, or 50 nm or less; and in the mid-wave infrared spectral region, the bandwidth can be 200 nm or less, 150 nm or less, or 100 nm or less, for example. In the ultraviolet spectral region, a bandwidth for the stream of modulated light-signal pulses can be emitted at a bandwidth of 20 nm or less, 10 nm or less, or 10 nm or less.

Regardless of the LED frequency pulse, center-emission wavelength(s), and/or bandwidth used, capitalizing on these advantageous photonic properties, e.g., rapid switching, stable-emission wavelengths, and/or narrow-bandwidths, permits both the modulation and the subsequent demultiplexing of LED lighting using pulse frequency, wavelength differentials (by emitting two or more wavelengths of light), and/or intensity modulation. Furthermore, in some examples, the stream of modulated light-signal pulses generated can be combined with a fourth factor, which can include (homogeneous) circularly-polarization of the light-signal pulses, either with passive filtration for encoding and decoding of the polarized light, or by synchronous encoding (e.g., modulating/multiplexing) and decoding (e.g., demultiplexing/demodulating) of the polarized light by rapid oscillation of left- and right-circular polarization.

The use of circular polarization may provide advantages over other forms of polarization for a number of reasons, though other types of polarization are not excluded. For example, there is no significant source of circularly-polarized light in nature; and thus, utilizing circular polarization in an instrument system permits very sensitive imaging against an essentially zero background. Furthermore, circularly-polarized light suffers very little depolarization due to fog and other fine particulates that may be present in low visibility conditions. Thus, light penetration depth through turbid media is much greater with circular polarization than with linear polarization. In further detail, circular polarization permits encoding directional information in an LED light source. Thus, by combining circular polarization with wavelength modulation and intensity modulation, for example, even more significant contrast enhancement can be achieved compared to using only one of these types of filtering/modulation.

In one example, the LED contrast enhancing systems of the present disclosure can be carried out in bistatic configuration that typically includes two subsystems. The two "subsystems" are said to be bistatic because there is a light-transmitting subsystem that can be at a first location, and a second light-receiving subsystem at a second location. However, in certain examples, both subsystems can be included on a common carrier, like an aircraft (rotary- or fixed-wing), automobile, truck, train, surface water vessel, submersible vessel, etc. (including either remote- or onboard piloted carriers), where light-signal is sent and received using reflected light to and from a remote location. Thus, these examples where two subsystems are present at a common location can be referred to as "monostatic" systems, even though there is still a light-transmitting subsystem and a light-receiving subsystem. Regardless of the way in that the LED contrast enhancing system is referenced, the systems of the present disclosure include both subsystems, either remotely located with respect to one another or on a carrier vehicle that uses reflected light, such as from a retroreflector, e.g., a corner cube reflector, or even from the environment in general without a specific retro-reflective device in place.

These configurations, it should be noted, permit the enhancement of "contrast," rather than brightness, by enhancing light-source contrast from the light-transmitting subsystem (e.g., on the ground at an airfield or reflected from the ground) while minimizing contrast thresholds of detection at the light-receiving subsystem (e.g., in an aircraft). In one specific example, the system can utilize modulating/polarization filtering light at the airport and demultiplexing/filtering/demodulating of the light on the airplane. One purpose of the ground modulation/filtering can be to enhance the contrast between the LED light source and other, background illumination, while also minimizing general visual "clutter," which can be defined as competing but unrelated sources of ground light such as vehicle headlights, parking lot lights, commercial light displays, etc., thus providing contrast-enhanced images of the ground lighting at an airfield, while minimizing background light. For example, an LED light at its source, such as on the ground, and a reception point, such as on an aircraft, can benefit from both encoding LED light and decoding LED light, respectively, with one or multiple categories of information, namely radiance, polarization (e.g., circular polarization either using passively filtering at both subsystems, synchronously oscillating at both subsystems, or a combination of both passive filtering and synchronous oscillation at either respective subsystems), and wavelength (color), etc. These categories of information, for example, can be used together at the same time and can be even more effective because the benefits can be multiplicative. By using two categories of information or even three categories of information, increasingly significant improvements can be further realized, e.g., longer visibility distances achieved. For example, with a correctly configured synchronous system in place daytime low visibility conditions of one quarter mile, for example, can be increased to LED light visibilities of at least 20 miles, at least 10 miles, at least 5 miles, at least 4 miles, at least 3 miles, at least 2 miles, or at least 1 mile, depending on the equipment and synchronization profile in place. For example, when using three categories of information light information together, longer distances may be possible than when using two categories or a single category. At least 10 miles, at least 5 miles, at least 4 miles, at least 3 miles, at least 2 miles, or at least 1 mile may even be achievable at night under low visibility conditions. Some results are even better as calculated and illustrated in Table 1 (which models one specific system by way of example) hereinafter.

With respect to encoding and/or filtering the LED light, coding (modulating) for light radiance levels, e.g. 100% compared to a fraction thereof, can be achieved by pulsing the power supplied to the LED light source at specific and defined modulation pulse frequency and timing, which can also include duty cycle synchronization. For example, if there are two LED lights, the duty cycle for each can be about 50% so that the two LED lights can alternate ON and OFF with essentially no temporal overlap, e.g. during one duty cycle, the period can be defined as: first LED light-ON and second LED light-OFF, followed by first LED light-OFF and second LED light-ON. As a definitional note, when describing duty cycles or cycles of synchronous optically detectable events, if a light is not specifically mentioned as being ON or OFF, it is understood that the light is OFF, allowing for some overlap such as for example due to trailing resonance or other minor overlap. Thus, during the single duty cycle mentioned briefly above, this same period can alternatively be described as: first LED light-ON followed by second LED light-ON, which conveys the same information in a more abbreviated format. Alternatively, these same four optically detectable events, or scene states, could be patterned or sequenced differently, such as first LED light-ON, first LED light-OFF, second LED light-ON, and second LED light-OFF. Other patterns could also be used, for example. In further detail, filtering the LED light for circular polarization can be accomplished by rejecting or filtering out unpolarized and linearly polarized light, but accepting right- or left-circularly-polarized light (or in some cases, accepting transmission for right- and left-circularly-polarized light). In one specific example, encoding (modulating) the LED light for wavelength and intensity can be achieved by using an LED light source including two or more LED emitters, or groups of emitters, of different center wavelengths (wavelength modulation), pulsed in a flashing pattern (intensity modulation), which can then be decoded at the light-receiving subsystem.

On the aircraft, for example, all three categories of modulated (intensity and wavelength) and polarized (circular polarization) information encoded in the LED light (or even other types of encoding) used to generate "the image" on the ground may be decoded by a processing unit that demodulates the light-signal that arrives (demultiplexed) in the form of a stream of digital images. For intensity demodulation (after demultiplexing), the light-receiving subsystem can subtract the image received when the light is pulsed "OFF" from that received when the light is pulsed "ON." OFF events during a cycle can occur in a few ways, such as by turning the LED light-OFF conventionally during a duty cycle. Alternatively, an OFF event can be generated optically without necessarily turning off the LED light per se. For example, a light-transmitting subsystem can include a synchronous homogenous circularly-polarizing filter (more generally referred to as a synchronous optical multiplexer) that oscillates between right- and left-polarization, and the light-receiving subsystem could include a passive homogenous circularly-polarizing filter that accepts only right-polarization (or only left-polarization). Thus, as the synchronous polarizer oscillates between right- and left-polarization, the LED light would appear ON at right-polarization events and OFF at left-polarization events. Alternatively, the synchronous polarizer could be located at the light-receiving subsystem and the passive polarizer could be at the light-transmitting subsystem with similar effect. Either way, a stream of modulated light-signal pulses can be generated optically using an LED light source that does not itself pulse per se. Or, in another example, a combination of LED light source pulsing and this type of optically generated pulsing may also be combinable to generate more complexity to the light-signal that is transmitted and received.

In still other polarization examples, passive homogenous circularly-polarizing filters could be used at both subsystems to pass circularly-polarized light through to a light imager, while rejecting other polarizations of light not transmitted with the same circular polarization. For wavelength demultiplexing, the light-receiving subsystem can use an optical demultiplexer, such as for example, one of two narrow bandpass filters in a synchronously alternating pattern, to reject light of undesirable wavelengths, or other optical demultiplexers. The optical image received, which can be filtered and then captured by imaging sensors synchronized by an image acquisition controller, can be relayed to a demodulation image processor that can utilize software to produce a contrast-enhanced or optimized digital image stream from the varied images captured by the synchronous demultiplexing system. Upon demodulation and processing in the computer system, such as by least squares, maximum likelihood, etc., methods, a real time or near-real time, continuous stream of images can then be displayed for the pilot on a video display, or remotely on a video display to an operator on the ground, such as a drone pilot. The image that is displayed can be, for example, a contrast-enhanced video stream of the pilot's target runway spread out therebeneath, with its edge lights or even centerline lights (if so equipped) accentuated, which would be suitable for the pilot to proceed with a visual landing, even in otherwise Instrument Flight Rules (IFR) conditions. In one example, the continuous stream of contrast-enhanced images can be generated from at least two wavelengths of light, and incorporate a weighted sum of four to eight digital images. The weighted sum can incorporate coefficients that accomplish both intensity and wavelength demodulation, for example, where the coefficients are determined using the least squares or maximum likelihood estimation mentioned above.

The mathematics behind the LED contrast enhancing systems of the present disclosure can provide some understanding of how these systems can be effective, as can the calculation that demonstrates the magnitude of visibility improvement that the systems described herein can be capable of achieving. These mathematics revolve around the FAA's established Runway Visual Range (RVR) Standard, but could be applicable to increasing visibility range in a variety of circumstances using a variety of mobile carriers. To provide useable performance parameters, in one example, the RVR can be modified, while retaining its functional form, allowing certain parameters to be appropriately modeled or described. Thus, in accordance with this, the performance of the enhanced contrast and imaging system described herein can provide detection and imaging capabilities superior to those as compared to those of the human eye. The current RVR standard is based on photometry (e.g., the measurement of human eye response). In accordance with examples of the present disclosure, radiometry (e.g., the measurement of absolute light energy) can be a more relevant measure of contrast-enhanced images in low visibility conditions. Thus, the mathematics herein can likewise utilize radiometry, which is relevant to instrument measurements.

One factor in the performance of the LED contrast enhancing systems of the present disclosure can relate to the system's ability to capitalize on various factors, such as intensity modulation, wavelength modulation, oscillatory polarization modulation, circularly-polarized light filtration, narrow bandpass filtration, etc., which provides light properties that the unaided human eye may not be able to detect or distinguish. In other words, the threshold of detection, even through otherwise low visibility conditions, can be reduced far below that which the eye can normally see, e.g., the system can operate so that the LED light-signal(s) can be sensed in a manner that is much more sensitive than that of the human eye. This reduced threshold of detection may also allow the LED contrast enhancing system to take advantage of the fundamental color purity that can be present in LED light and that can sometimes be too bright for the human eye to comfortably or safely view. In further detail, the LED contrast enhancing systems can reject light-signals of lesser purity or mixed colors, with its use of wavelength matched filters, e.g., narrow bandpass filters. In further detail, the LED contrast enhancing systems described herein can greatly increase the gathering ability of the LED light-signal(s) through the use of a light receiver that can include a telescopic lens for collecting many more times, e.g., up to 50 times or more, incoming light compared to the human eye.

Even though there are many ways of modulating or filtering light to encode it for transmitting and then demultiplexing and/or filtering to decode light for enhancing the contrast of the light, for purposes of discussion, intensity modulation, wavelength, modulation, and circularly-polarizing filtration are discussed together as it relates to the mathematics described herein. Notably, however, other forms of modulation can be implemented to further enhance the systems of the present disclosure, or other forms of modulation can be used alternatively. Rather than using two pulsed LED lights to provide intensity modulation and wavelength modulation and demultiplexing/demodulation based on four (or more) unique, optically detectable events (e.g., first LED light-ON, first LED light-OFF, second LED light-ON, second LED-light-OFF; in any pattern or timing), an alternative system could be modified to use only one pulsed LED light and a synchronous homogeneous circular polarizer that switches between right- and left-circular polarization synchronously with the pulses. This type of system can generate three (or more) optically detectable events, namely LED light-ON with right-circular polarization, LED light-ON with left-circular polarization, and LED light-OFF. If two pulsed LED lights were used with a synchronous homogeneous circular polarizer, five (or more) optically detectable events could be generated, namely first LED light-OFF and second LED light-OFF, first LED light-ON with right-circular polarization, first LED light-ON with left-circular polarization, second LED light-ON with right-circular polarization, and second LED light-ON with left-circular polarization. In still other examples, LED light radiance could be changed, such as LED light 100% radiance-ON, LED light with fractional radiance-ON (e.g., 40% to 60%), and LED light-OFF. These could likewise be coupled with any of a number of other types of modulation, multiplexing, and/or filtration (e.g., either passive filtration or using electrically actuated synchronous oscillating filtration).

A more specific list of various example combinations of optically detectable events per transmitting/receiving cycle can be generated (in any sequence and/or timing pattern including overlapping events and/or non-overlapping events), as follows:
  i) first LED light-ON and first LED light-OFF (two optically detectable events from one LED light);
  ii) first LED light-ON with left-circular polarization, first LED light-ON with right-circular polarization, and first LED light-OFF (three optically detectable events from one LED light with synchronous homogeneous circular polarizer);
  iii) first LED light-ON with first radiance (e.g., at or near 100%), first LED light-ON with second radiance (e.g., 40% to 60%), and first LED light-OFF (three optically detectable events from one LED light);
  iv) first LED light-ON, first LED light-OFF, second LED light-ON, and second LED light-OFF (four optically detectable events from two LED lights);
  v) first LED light-OFF and second LED light-OFF, first LED light-ON with right-circular polarization, first LED light-ON with left-circular polarization, second LED light-ON with right-circular polarization, and second LED light-ON with left-circular polarization (five optically detectable events from two LED lights with synchronous homogeneous circular polarizer); or
  vi) first LED light-OFF and second LED light-OFF; first LED light-ON with first radiance, first LED light-ON with second radiance, second LED light-ON with first radiance, and second LED light-ON with second radiance (five optically detectable events from two LED lights).

Thus, as can be seen in examples i) to vi) above, several examples are provided where from two to five unique optical events can be generated by combining various types of synchronous modulation of the LED light source. Thus, it can be appreciated that by layering still another type of synchronous light modulation, even more unique light events can be generated, e.g., up to nine or more unique optical events during a single duty cycle or modulation/demodulation cycle. In accordance with this, in practical terms, from two to nine, three to nine, four to nine, etc., unique optical events can be generated and synchronized with a light imager to enhance light contrast from an LED light source, for example. Furthermore, it is noted that these optically detectable events do not need to occur in any particular order, and indeed, some optically detectable events can be generated and received at the same time. For example, in the simple example of the use of two LED lights, the LED light-ON optical event of a first LED light and the LED light-OFF optical event of a second LED light can occur simultaneously. For example, the two LED lights can be oscillated or pulsed in an alternating pattern with little or no temporal overlap, e.g., each emitting 50% or less during single duty cycle (or at some other percentage ratio equaling up to 100%). In further detail, each LED light could emit for from 30% to 60%, from 40% to 55%, or 45% to 50% of a single duty cycle in an alternating pattern. Up to a 10% overlap (10% of duty cycle time where both LED lights are actively emitting, excluding trailing discharge time) can be considered "little to no temporal overlap," for example. These four optically detectable events, or scene states, could alternatively occur in sequence, e.g., first LED light-ON, first LED light-OFF, second LED light-ON, and second LED light-OFF. Other patterns could also be used. Thus, various optical events can occur in any order, sequence, etc., during a single modulation/demodulation cycle, with some events occurring in a patterned series and/or others occurring in parallel. In some instances, the use of multiple imaging sensors at the light imager can be helpful in achieving some flexibility in this regard. Furthermore, on top of any light modulation that may occur, simple filtration using polarizers at both the light-transmitting subsystem and the light-receiving subsystem, the use of narrow bandpass filters at the light-receiving subsystem, and/or other appropriate filters can be used to further enhance the optical performance of the systems of the present disclosure.

With this in mind, the systems described herein with respect to the mathematical models and calculations, for convenience, are exemplified using only pulsed light (intensity modulation), left- or right-homogeneous circularly-polarization (passive filtration), and two wavelengths of light with offset center-emission wavelengths (wavelength modulation), even though many other combinations of modulation and/or filtration can be used as described above. Thus, with respect to one specific mathematical model with these specific "enhancements," differences can be factored into the quantitative analysis of the performance of the systems described herein, which at a basic level, can be evaluated compared to how the unaided eye of a pilot sees the runway. In accordance with this, equations that are currently used in calculating the Runway Visual Range (as seen by a pilot without the aid of enhanced imagery) can be adapted and modified to take into account the specific equipment described in this example.

The FAA Runway Visual Range (RVR) Standard

Essentially, the FAA Runway Visual Range (RVR) is a calculated estimate of how far down a runway a pilot should be able to see. It is calculated from the values of three measurements: (1) the atmospheric extinction coefficient; (2) the ambient light level (background luminance); and (3) the intensity of the runway lights. The RVR is an absolute standard, which is as follows: an RVR below 50 feet is considered zero visibility; and an RVR above 6,500 feet is considered unrestricted visibility. Two RVR values are calculated at airports routinely: the first for seeing objects during daylight hours and the second for seeing lights during nighttime hours.

The RVR value for seeing objects is based on both Koschmieder's Law and measurements from a ground-based a visibility sensor that uses forward light scattering to estimate the atmospheric extinction coefficient. The FAA states that Koschmieder's Law for RVR should give zero whenever the ambient light level (background light level) is below $6.85 \times 10^{-6}$ candela/meter$^2$, which is the accepted value for nighttime background luminance. This condition could occur when there was heavy nighttime fog, smoke, snow, or other obscurant.

The RVR value for seeing runway lights is based on Allard's Law; a measurement of the atmospheric extinction coefficient; the intensity of the runway lights (which is one of five standard intensity levels set by airport control tower personnel); and an estimate of the visual threshold (which is the minimum luminance required for a pilot to distinguish a small light source from the background luminance). Allard's Law gives the distance at which a pilot is expected to see lights of a specified intensity, such as runway lights that have known intensity.

Runway Visual Range (RVR) Standard

The two threshold values from the FAA RVR standard that can be altered to accommodate the higher performance capabilities of the LED contrast enhancing systems of the present disclosure include the contrast threshold value, Ct, from Koschmieder's Law, and the visual threshold value, $E_t$, from Allard's Law.

The contrast threshold value, $C_t$, can be lowered to 0.005, from 0.05. This is because the imagers onboard the aircraft are highly sensitive to incoming light. They are capable of achieving a quantum efficiency factor of 80%; and they also attain very low noise operation that is limited only by the extant photon-shot noise, which is determined by the pixel-electron well depth of the imagers. Thus, equation (1) is provided, as follows:

$$PSNR = \frac{1}{\sqrt{N_W}} = \frac{1}{\sqrt{40{,}000}} = 0.005 \qquad (1)$$

where:
PSNR=photon shot noise ratio
NW=pixel electron well depth in numbers of electrons The parameter for the visual threshold, $E_t$, for dependence background luminance from Allard's Law is routinely taken as −5.7, whereas for the LED contrast enhancing system of the present example can be lowered to −6.7. This visual threshold is lowered because of three attributes of example components of the LED contrast enhancing system of the present example. It should be noted that these calculations are based on specific equipment, and other equipment could likewise be used, substituted, added, subtracted, etc. The values used for these calculations are thus, for exemplary purposes only. The three attributes that justify the modification of the dependence background luminance include the great light-gathering capacity of the telescopic lens included in the light receiver onboard the aircraft; the rejection of noncircularly-polarized light by the homogeneous circularly-polarizing filter; and the wavelength selectivity of the synchronous wavelength demultiplexer. To illustrate, equation (2) is provided, as follows:

$$\log[E_t(B)] = -6.7 + 0.64 \cdot \log(B) \qquad (2)$$

Where:
$E_t$=visual threshold luminance
B=background luminance

Thus, equation (3) below can become a basic RVR standard in accordance with one specific example of the present disclosure, though other RVR standards could be used when other equipment and/or other configurations are used.

$$RVR_{CES}(R, \sigma, B, I) = \text{root}\left[10^{-6.7+0.64 \cdot \log(B)} - \frac{I \cdot e^{-\sigma \cdot R}}{R^2}\right] \qquad (3)$$

Where:
$RVR_{CES}$=runway visual range using one specific LED Contrasting Enhancing System (CES) of the present example R=independent variable that is varied to make the argument of the root function equal zero
σ=atmospheric extinction coefficient
B=background luminance
I=runway light intensity These changes will neither weaken nor strengthen the current FAA RVR Standard. They can, in effect, create a new and separate, but equally stringent, optical instrument assisted, human vision category within the existing, FAA Visual Flight Rules (VFR) category. Furthermore, it is noted that this new category could yield a completely consistent and reliable determination of runway light visibility conditions. The current FAA RVR Standard assumes a system's instruments respond in ways that are unvarying, repeatable, and precisely quantifiable.

The improvement in pilot visibility in low visibility atmospheric conditions that results from the proposed LED contrast enhancing system of the present example can be significant. This improvement can be evaluated quantitatively, according to the assumed equipment described above, by calculating the ratio of the RVR of the new instrumental system to the FAA's traditional RVR, as shown in equation (4), as follows:

$$F_{impv} = \frac{RVR_{CES}(R, \sigma', I', B')}{RVR_{FAA}(R, \sigma, I, B)} \qquad (4)$$

Where:
$F_{impv}$=Multiplicative factor by which the LED contrast enhancing system of the present example increases the RVR distance over that of a human
$RVR_{CES}$=runway visual range using the LED contrast enhancing system of the present example
R=independent variable that is varied to make the argument of the root function equal zero
σ'=effective atmospheric extinction coefficient for the LED contrast enhancing system of the present example
I'=effective runway light intensity imaged by the LED contrast enhancing system of the present example
B'=effective background luminance imaged by the LED contrast enhancing system of the present example
$RVR_{FAA}$=runway visual range using the FAA values for human vision
σ=atmospheric extinction coefficient
I=runway light intensity
B=background luminance The ratio of improvement under the LED contrast enhancing system of this example can be as much as a factor of 50 for nighttime conditions and a factor of 90 for daytime conditions. Note that these are multiplicative factors, not percentage improvements. In simple terms, these factors can equate to the following representative improvements in pilot visibility in fog, smog, smoke, etc., as outlined in Table 1, as follows:

TABLE 1

| Measured daytime visibility | Visibility with the LED contrast enhancing system of the present example |
|---|---|
| 1/16 mile | 5.6 miles |
| 1/8 mile | 11.3 miles |
| 1/4 mile | 22.5 miles |
| 1/2 mile | 45.0 miles |

TABLE 1-continued

|  | Visibility with the LED contrast enhancing system of the present example |
| --- | --- |
| Measured nighttime visibility | |
| 1/16 mile | 3.1 miles |
| 1/8 mile | 6.3 miles |
| 1/4 mile | 12.5 miles |
| 1/2 mile | 25.0 miles |

Returning now to the FIGS., particularly FIGS. 2, 3, 5 and 6, each of which include a light-transmitting subsystem, these FIGS. can be further described in the context of the wiring at an airport. This specific example provides merely one system for "wiring," "communicating," and/or "powering" the equipment of the present disclosure at an airport, as either a new lighting installation or an adaptation of an existing installation. However, there are many other ways of implementing the systems (or light-emitting subsystems) of the present disclosure. More specifically, in FIG. 3, there is shown a schematic diagram of a light modulating/filtering system that may be based, for instance, at an airport or other location where there are LED light fixtures and where improved visibility is desired. The system may include, for example, a first reference oscillator 26, such as a Global Positioning System (GPS)-disciplined oscillator to receive a reference signal from a remote or broadcasting source 22, which can be a GPS satellite in this example. A GPS disciplined oscillator (GPSDO) is a combination of a GPS receiver and a high quality, stable oscillator, whose output is controlled to agree with the signals broadcast by GPS and GNSS satellites. This may be a rubidium, cesium, or quartz crystal, oven-controlled GPS-disciplined oscillator, for example. A GPS-disciplined oscillator, for example, may produce a continuous, high frequency, reference signal, with a frequency stability of better than two parts per billion per year, for example, though lower frequency stability would still provide functionality in some instances. Such a reference signal can be utilized to coordinate, or synchronize, a stream of modulated light-signal pulses produced by one or more LEDs at the airport lighting system on the ground, with demultiplexing and filtering detection and imaging of the emitted stream of light occurring onboard the aircraft, to be displayed to the pilot (or even a remote pilot on the ground).

Based on the output of the GPS-disciplined oscillator, or first reference oscillator 26, a synchronous modulation signal generator 32 may convert the relative high frequency reference signal produced by the oscillator, e.g., on the order of about 10 MHz, to a relative low frequency electrical signal, e.g., from 100 Hz to 130,000 Hz, or from 100 Hz to 48,000 Hz, or other ranges described elsewhere herein. The term "relative" is used to clarify that the two signals are not generically "high" or "low," but rather are high and low relative to one another. The relative low frequency electrical signal can be 100 Hz as a minimum because this frequency is above what is considered to be the visual flicker fusion rate, whereas in this example, 48,000 Hz can be used as a practical upper limit so that the signal can be relayed through the isolation transformer 40 (or multiple isolation transformers along the airfield series lighting loop 38). In one configuration, it may be cost effective to provide a single synchronous modulation signal generator 32 located, for example, in the electrical power vault at the airport. In some configurations, however, the synchronous modulation signal generator may be located at each individual LED light fixture where light is to be modulated (not shown).

The relative low frequency electrical signal produced by the synchronous modulation signal generator 32 can be communicated to a first power line carrier communications modem 34 and, ultimately, to a second power line carrier communications modem 42 via a constant current regulated (CCR) AC power supply 36 and the airfield series lighting loop 38. The first power line carrier communications modem can be utilized by the airport control tower to monitor and control the airport lighting system. It can also transmit communication from the synchronous modulation signal generator to the CCR AC power supply. In some instances, this first power line carrier communications modem can be replaced by a system that couples the synchronous modulation signal generator directly to the CCR AC power supply.

The constant current regulated (CCR) AC power supply 36 can provide electrical communication signals to the LED light fixture or LED light source via the airfield series lighting loop 38. The CCR can also regulate the electrical current supplied to each fixture so that the individual LED lights 52, 54 in the system emit at about the same intensity. If advantageous, the constant current regulated AC power supply may be eliminated or bypassed, and the synchronous modulation signal generator 32 can be connected directly, through a coupling circuit, to the airfield series lighting loop. Furthermore, both the CCR AC power supply and the first power line carrier communications modem 34 may be bypassed by connecting the synchronous modulation signal generator directly to the airfield series lighting loop via a coupling circuit.

In some configurations, the airfield series lighting loop 38 serves as the main cable that carries electrical power, as well as monitoring and synchronous control information, to all of the individual light fixtures that are part of the overall airport lighting system, or at least the light system where the system of the present disclosure is being implemented (e.g., runway, taxiway, apron, tower lighting, etc.). Use of the airfield series lighting loop can prevent radio frequency interference with navigation and communication transmissions that may result from the use of wireless transmissions; however, wireless communication may be acceptable in locations such as improvised or low traffic landing strips, for instance, to distribute the synchronous modulation signal generator's output to the light fixtures. Fiber optic cables may also fulfill this or other distribution functions. The airfield series lighting loop can connect to multiple individual light fixtures via its isolation transformer, for example.

The isolation transformer 40 can separate the electrical power used to feed each individual LED light fixture from the total electrical load carried by the airfield series lighting loop 38. A secondary winding can also be present thereon to carry communication control signals to a second power line carrier communications modem 42, and may also supply AC electrical power to the electromagnetic interference filter 44. An electromagnetic interference filter 44 may receive the AC electrical power from the isolation transformer 40 and relay it to the LED DC power converter 46. The electromagnetic interference filter 44 may remove the modem carrier frequency signal from the AC electrical power.

The LED DC power converter 46 can then change the alternating current (AC) electrical power received from the electromagnetic interference filter 44 into direct current (DC) electricity suitable for powering and pulsing the LED lights 52, 54 of the LED light source 50. The LED DC power converter can then send the new DC power to the synchronous power controller 48. In an alternative example, the LED DC power converter can be replaced by an alternative source of electrical power, such as a solar photovoltaic cell, a thermoelectric power generator, a fuel cell, etc.

The second power line carrier communications modem 42 can be fed by the isolation transformer 40 and relay a synchronous modulation signal to the synchronous power controller 48. In some configurations, the second power line carrier communications modem can engage in a two-way exchange with the first power line carrier communications modem 34 to control light output and monitor the status of the light fixture's LED light source 50. The second power line carrier communications modem, in some circumstances, can be eliminated and replaced by a coupling circuit that would extract, from the secondary winding of the isolation transformer, the signal sent from the synchronous modulation signal generator.

The synchronous power controller 48 can provide appropriately synchronized power pulses to both a first and a second LED light 52, 54 that can be synchronously controlled by providing an emitting pattern that is coordinated, e.g. alternating with little to no temporal overlap, or otherwise patterned in its emission cycle. The first and second LED light can be physically arranged in a color pair, or using any two ultraviolet, visible, or infrared wavelengths of light.

Any suitable LED light 52, 54, e.g., bulb or LED light-emitting semiconductor, laser, solid state emitter, etc., can be used at the LED light source 50. For specific applications to airports, it can be desirable to utilize bulbs or emitters in compliance with FAA requirements for color wavelengths and output luminance. By way of example and not of limitation, these may include: red, emitting at 640 nm; yellow, emitting at 575-580 nm; green, emitting at 495-534 nm; blue, emitting at 460-475 nm; white (combining red, green and blue at emission intensities in the proportions suitable to achieve a correlated color temperature of 1800 to 5000 degrees Kelvin). White LED light could also be produced using blue and yellow LED sources with an appropriate intensity ratio to generate the correlated color temperature of 1800 to 5000 degrees Kelvin.

The output optic 56 associated with the LED light source 50 can be positioned to capture the synchronously modulated light from the first and second LED lights 52, 54. The output optic can include, for example, a parabolic reflector and a prism, which are beam-forming/beam-directing optics. The parabolic reflector can, thus, partially collimate the synchronously generated beam of modulated light-emission pulses to concentrate the intensity beam. However, in one example, the parabolic reflector can be replaced by a total internal reflectance LED light extraction optic (not shown).

The first polarizing filter 58, e.g., homogeneous circularly-polarizing filter in one example, receives light from the output optic and filters it to reject unpolarized or linearly-polarized light. The circularly-polarizing filter can thus transmit right- or left-circularly-polarized light, which in this specific example, is also intensity- and wavelength modulated for decoding or demultiplexing/demodulation by the light-receiving subsystem onboard the aircraft.

Returning to FIG. 4, again, this example is based on an airport subsystem, which by definition herein includes controlled airports, uncontrolled airports, airstrips, heliport, or aircraft carrier landing areas, for example. However, the concepts described herein can be applied to other mobile carriers, as previously mentioned. In FIG. 4, this example provides a schematic diagram of a light-receiving subsystem, which can be a light-filtering/demultiplexing and demodulating and image processing system that may be located, for example, on an aircraft or other mobile carrier that would benefit from improved visibility of its destination. The light-receiving subsystem 70 can generally include a second reference oscillator 76, such as a GPS-disciplined oscillator (similar to that described in the context of FIG. 3. A synchronous image acquisition controller 82 can be included that converts a reference signal from a synchronous relative high frequency to a synchronous relative low frequency in the form of one or more signal(s) suitable for synchronous optical demultiplexing and/or image acquisition. The light-receiving subsystem in this specific example can also include a second (passive) polarizing filter 72, such as a homogeneous circularly-polarizing filter; a light receiver assembly 74, which can include a telephoto lens for capturing light and focusing the light on a light imager or an intermediate synchronous optical demultiplexer or through a filter. For example, a synchronous optical demultiplexer, such as synchronous wavelength demultiplexer 86, can be controlled by one of the relative low frequency signals generated by the synchronous image acquisition controller 82. A light imager 100, which can include a first imaging sensor 102 and a second imaging sensor 104, can also synchronously receive the stream of modulated light-signal pulses and convert the optical information to a stream of demultiplexed digital images, or electrical signal. The light imager, thus, can also be controlled by a relative low frequency signal generated by the image acquisition controller. Thus, the relative low frequency signal sent to the optical demultiplexer (e.g., wavelength demultiplexer) and the relative low frequency signal sent to the light imager (e.g., including imaging sensors) can be the same relative low frequency signal, or can be two or more distinct relative low frequency signals, provided the various signals appropriately establish synchronization with respect to the light gathering operation of the optical demultiplexer(s) and the light imager. The stream of demultiplexed digital images can then be demodulated and image processed using a demodulation image processor 150 that can then be sent to a display where real time or near-real time video is displayed to an output display 152, which can be a video screen provided directly to the pilot as an enhanced vision system, or through other avionics that may add other information such symbology or other images fused therewith, e.g., infrared enhanced view of the ground, etc., whether the pilot is onboard or piloting remotely, e.g., drone pilot.

As previously described, the GPS-disciplined oscillator (which is the second reference oscillator 76) can produce a continuous relative high frequency reference signal that is used to coordinate, or synchronize, the LED light produced by the ground-based airport-lighting subsystem with the detection and imaging of that light onboard the aircraft. It can relay this signal to a synchronous image acquisition controller 82 to be down converted to synchronous relative low frequency signals(s) for synchronous control of the timing and light-receiving frequency of the light imager (also referred to as a light imaging system) 100 and/or the synchronous optical demultiplexer 84. A rubidium, cesium, or oven controlled, quartz crystal GPS-disciplined oscillator, or other similar oscillator, can be utilized, for example.

The synchronous modulation signal generator 82 can convert the relative high frequency reference signal produced by the GPS-disciplined oscillator to a relative low frequency electrical signal (or lower frequency signal) to control both the light-receiving timing and frequency of the light imager 100, e.g., including a first imaging sensor 102 and a second imaging sensor 104, and a synchronous wavelength demultiplexer 86. A second polarizing filter 72, which in this example can be a homogeneous circularly-polarizing filter which is the outermost optical element in the light-receiving subsystem, can reject unpolarized or linearly-polarized light and pass either right- or left-circularly-polarized light to the light receiver assembly, or both right and left-circularly-polarized light if the polarizer filter is a compound homogeneous circularly-polarizing filter.

The light receiver assembly 74 can include, for example, a telescopic lens with an auto-focus feature, an auto-exposure feature, a focal distance of at least 350 mm, and/or an aperture of 50 mm or larger. A light receiver assembly of this type can have greater light gathering capacity than the human eye.

In one configuration, the synchronous wavelength demultiplexer 86 can receive image input (or the stream of modulated light-signal pulses) from the light-receiving assembly 74, and can then gate or time the pulses using one of the relative low frequency signals received from the synchronous image acquisition controller 82. The synchronous wavelength demultiplexer can include a digital micromirror device, for example, that directs the focused stream of modulated light-signal pulses (emitted from the ground LED light source and focused from the light receiver assembly) along one of two, alternating optical paths, each of which can be filtered by a narrow bandpass filter whose center wavelength corresponds to the center-emission wavelength emitted by the first or second alternating LED light sources of the airport-based system. This arrangement is shown in greater detail in FIG. 8. Returning to FIG. 4, however, the first imaging sensor 102 and the second imaging sensor 104 of the light imager 100 may be timed by the synchronous image acquisition controller and may detect narrow bandpass filtered images from the synchronous wavelength demultiplexer.

Though this arrangement is specifically disclosed and shown in FIG. 4, other arrangements can likewise be used that do not utilize a synchronous optical demultiplexing, for example, such as the use of two light receivers individually associated with two light imagers, where each light imager is optically associated with a narrow bandpass filter that has a similar centerline wavelength as the respective LED light wavelength (each rejecting the other wavelength of light). Still further, a single light-receiving assembly can be used that generates a large enough light pattern to focus light on two adjacent imaging sensors, where each imaging sensor is optically associated with two different narrow bandpass filters that are closely matched to the respective LED light wavelengths emitted from the LED light source (each rejecting the other wavelength of light). Still further, rather than a synchronous wavelength demultiplexer used to modulate the focused light, a synchronous homogeneous circularly-polarizing filter could be used to decode similarly encoded light also with coordinated oscillating polarity emitted from the ground, etc. Beam splitting prisms, such as a dichroic prism or a trichroic prism, could likewise be used for color separation and to direct two (or three) different wavelengths of light toward two or three different imaging sensors.

The first imaging sensor 102 and the second imaging sensor 104 of the light imager 100 can likewise be timed by the synchronous image acquisition controller 82. In this arrangement, the first imaging sensor and the second imaging sensor of the light imager can each produce two digital images of the ground lighting per each full demodulation cycle (which cycle can include demultiplexing, computer demodulation, and image processing), e.g., one with ground-based LED lights "ON" and one with LED lights "OFF." Together, the imagers may produce four, digital images per each cycle. The synchronous wavelength demultiplexer can be used to separate or demultiplex the two different wavelengths of light, or some other optical separation approach as described elsewhere herein can alternatively be used. With respect to the imaging sensors, in some circumstances, these two imaging sensors can be replaced by a single imager. For example, the output from the onboard synchronous optical demultiplexer 84 (or optical wavelength demultiplexer) can be reconfigured to produce a single, optical output path.

The demodulation image processor 150 can include, for example, a high speed computer, a high resolution display screen, and the software used to control their function. It may create a continuous series of contrast-enhanced or optimized digital images by utilizing an appropriate numerical method, such as "least squares" estimation or optimization, or "maximum likelihood" estimation or optimization, for demodulation of the demultiplexed images captured by the light imager. Other demodulation approaches can also be used. Utilizing least squares optimization, the contrast-enhanced image created by the image processing and display system can be expressed mathematically as a vector product involving a row vector of weights and a column vector of images. The image processing software can encompass such functions as pixel averaging to increase the signal-to-noise ratio of the images; estimating the locations of lights not yet imaged; registering the stream of images one to another to remove smearing of the LED-light-source images due to the motion of the aircraft; further increasing light-to-background contrast by well-known digital image processing techniques; etc. In one example, the continuous stream of contrast-enhanced images can be generated from at least two wavelengths of light, and incorporate a weighted sum of four to eight digital images. The weighted sum can incorporate coefficients that accomplish both intensity and wavelength demodulation, for example, where the coefficients are determined using the least squares or maximum likelihood estimation mentioned above.

The contrast-enhanced images produced by the demodulation image processor 150 may then be relayed as a streaming video image as an output display 152 to the pilot in the cockpit or to a remote pilot on the ground in real time as a continuous stream of images of the airport lights beneath the plane. The image stream can be displayed on a heads-up display (windscreen), an in-panel or other standard display, or a near-eye display, such as a head-mountable display.

It is noted that, as used in this specification and the appended claims, singular forms such as "a," "an," and "the" may include the plural referents unless the context clearly dictates otherwise. Thus, for example, reference to "an LED light" can include one or more of such LED lights, and reference to "the narrow bandpass filter" can include reference to one or more of such filters.

As used herein, "encoding" can refer to either "modulating" or "multiplexing" light signal pulses at a light-transmitting subsystem. The term "decoding" can refer to either "demultiplexing" or "demodulating" light signal pulses at a light-receiving subsystem. Examples of modulation can include wavelength modulation (using two or more wavelengths of light), intensity modulation (using pulsed light), radiance modulation (using different levels of light radiance), etc. An example of optical multiplexing can include the use of oscillating polarization to optically apply cycling right- and left-polarization to a light signal, etc. Both can be forms of encoding a light signal. Regarding decoding, examples of optical demultiplexing can include wavelength demultiplexing, polarization demultiplexing, etc. Decoding using computer processors, software, etc., can also include demodulation, where captured imagery by a light imager can be demodulated and processed as described herein. That being understood, the use of a "passive" filter generally can also be used to code and decode light-signal, e.g., polarization to transmit and accept light of a certain polarization and reject other forms of light, narrow bandpass filters to accept narrow bandwidths of light and reject light outside of those bandwidths, etc. Often modulation/multiplexing/demultiplexing/demodulation can be used in conjunction with simple or passive filtration to generate even more significant improvements, etc.

It should be understood that, while the modulation, demodulation, multiplexing, demultiplexing, filtering, processing, and/or displaying, etc., processes described herein have been presented herein in accordance with systems, subsystems, processes, flow diagrams, and the like, it is conceivable that the order of many processes or arrangement of various component devices or systems may be changed, and that the systems and methods may still function for modulating, demodulating, multiplexing, demultiplexing, filtering, processing, displaying, etc., for synchronous encoding and decoding of light. For example, a narrow bandpass filter is shown in FIG. 8 as being used in one particular manner. However, this filter can be used at any location along a light-signal path, including at the LED light source, before or after the light receiver assembly, etc., instead of a wavelength demodulator.

What is claimed is:

1. A light-transmitting subsystem, including:
   an LED light source including a first LED light to emit a first wavelength of light with a first center-emission wavelength, and a second LED light to emit a second wavelength of light with a second center-emission wavelength that is offset from the first center-emission wavelength;
   a first reference oscillator to receive a reference signal from a remote or broadcasting source; and
   a synchronous modulation and power system to convert the reference signal from a synchronous relative high frequency signal to a synchronous relative low frequency signal, and to provide synchronized power pulses to the first LED light and the second LED light in synchronous correlation with the synchronous relative low frequency signal to generate a stream of modulated light-signal pulses which includes a first modulated wavelength of light and a second modulated wavelength of light.

2. The light-transmitting subsystem of claim 1, wherein the light-transmitting subsystem is ground-based at a mobile carrier field.

3. The light-transmitting subsystem of claim 2, wherein the mobile carrier field is an airport.

4. The light-transmitting subsystem of claim 3, wherein the synchronous modulation and power system includes an airfield series lighting loop that powers a plurality of LED light sources connected in series along the loop.

5. The light-transmitting subsystem of claim 3, wherein the LED light source includes one or more LED light that is associated with an output optic, wherein the one or more LED light and the output optic combine to collimate or expand light emitted therefrom to approximate a range of glide path angles suitable for receiving aircraft at an airport.

6. The light-transmitting subsystem of claim 1, wherein the light transmitting subsystem is located on a mobile carrier.

7. The light-transmitting subsystem of claim 1, wherein the reference oscillator is a GPS-disciplined oscillator and the synchronous modulation and power system is disciplined by the GPS-disciplined oscillator.

8. The light-transmitting subsystem of claim 1, wherein the reference oscillator includes a quartz or rubidium oscillator that is broadcast from an RF source and the synchronous modulation and power system is disciplined by the quartz or rubidium oscillator.

9. The light-transmitting subsystem of claim 1, wherein the synchronous modulation and power system further comprises an electromagnetic-interference filter to remove one or more carrier frequency signal carried by alternating-current electrical power used to send signal and power to the LED light source.

10. The light-transmitting subsystem of claim 1, wherein the synchronous modulation and power system further comprises a direct-current power source to provide direct-current to the LED light source.

11. The light-transmitting subsystem of claim 1, wherein the synchronous modulation and power system further comprises a synchronous power controller to control timing and frequency of synchronized pulses of power to the LED light source.

12. The light-transmitting subsystem of claim 1, wherein the LED light source is optically associated with a passive homogenous circularly-polarizing filter.

13. The light-transmitting subsystem of claim 1, wherein the LED light source is optically associated with either a passive narrow bandpass filter.

14. The light-transmitting subsystem of claim 1, wherein the LED light source is optically associated with an optical multiplexer including a synchronous homogeneous circularly-polarizing filter, a synchronous bandpass multiplexer, or a combination thereof.

15. An LED light assembly to connect to an airfield lighting loop, comprising:
   an LED light source to generate a stream of modulated light-signal pulses as a collimated beam of light in an upwardly angled orientation generally within or overlapping with a range of incoming aircraft glide path angles, the light source including one or more LED light to generate the stream of modulated light-signal pulses and an output optic to concentrate or expand the stream of modulated light-signal pulses to form the collimated beam of light; and
   a synchronous modulation and power system to control emission timing and pulse frequency of the one or more LED light in a coordinated and synchronously modulated pattern.

16. The LED light assembly of claim 15, wherein the one or more LED light includes a first LED light and a second LED light.

17. The LED light assembly of claim 15, wherein the synchronous modulation and power system includes an isolation transformer to limit and isolate AC electrical power received from the airfield lighting loop, a DC power converter to convert the AC electrical power received through the isolation transformer to DC electrical power, and a synchronous power controller to control the emission timing and pulse frequency.

18. The LED light assembly of 15, further comprising a second LED light source to generate a second stream of modulated light-signal pulses as a second collimated beam of light in an upwardly angled orientation generally within a second range of incoming aircraft glide path angles, the second LED light source also including one or more LED light to generate the second stream of modulated light-signal pulses, and a second output optic to concentrate the second stream of modulated light-signal pulses to form the second collimated beam of light.

19. The LED light assembly of claim 18, wherein the one or more LED light of the second LED light source includes a third LED light and a fourth LED light.

20. The LED light assembly of claim 18, wherein the LED light source and the second LED light source to generate two diverging beams of light pointed in opposite directions along an x-axis in the upwardly angled orientation to provide runway lighting in generally opposite directions along a single runway.

21. The LED light assembly of claim 15, wherein the output optic is optically associated with a passive homogeneous circularly-polarizing filter, a synchronous homogeneous circularly-polarizing filter, a passive narrow bandpass filter, a synchronous narrow bandpass filter, or a combination thereof.

22. The LED light assembly of claim 15, wherein:
the coordinated and synchronously modulated pattern is established in accordance with a synchronous frequency of electrical signal that is received through the isolation transformer, or which is generated at the LED light assembly after AC electrical power is received through the isolation transformer;
an electromagnetic interference filter is positioned at the LED light assembly; or
both.

23. A method of enhancing contrast of LED lighting relative to background lighting, comprising:
emitting, using an LED light source at a light-transmitting subsystem location, a stream of modulated light-signal pulses;
receiving, using a light imager at the light-receiving subsystem location, the stream of modulated light-signal pulses;
synchronously correlating a power pulse frequency and timing of the LED light source with a light-receiving frequency and timing of the light imager;
demodulating the stream of modulated light-signal pulses synchronously received by the light imager to generate a stream of synchronous digital images; and
processing the stream of synchronous digital images to generate enhanced contrast display imagery.

24. The method of claim 23, wherein the enhanced contrast digital imagery is provided as a video image, wherein the enhanced contrast digital imagery includes enhanced contrast of light originating from the LED light source relative to background lighting that did not originate from the LED light source.

25. The method of claim 23, wherein the light-transmitting subsystem and the light-receiving subsystem are at remote locations with respect to one another.

26. The method of claim 23, wherein the light-transmitting subsystem and the light-receiving subsystem are both on a mobile carrier, and the method further comprises reflecting the stream of modulated light-signal pulses from the LED light source to the light imager.

27. The method of claim 23, wherein synchronously correlating includes the use of a common reference signal at both the light-transmitting subsystem and the light-receiving subsystem.

28. The method of claim 27, wherein the common reference signal is generated at an RF source or a satellite source.

29. The method of claim 28, wherein the RF source or the satellite source provides the common reference signal using a quartz or rubidium oscillator.

* * * * *